(12) United States Patent
Bernreitner et al.

(10) Patent No.: US 9,394,073 B2
(45) Date of Patent: Jul. 19, 2016

(54) EXTRUSION BLOW MOLDED BOTTLES

(71) Applicant: Borealis AG, Vienna (AT)

(72) Inventors: Klaus Bernreitner, Linz (AT); Katja Klimke, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/648,079

(22) PCT Filed: Dec. 10, 2013

(86) PCT No.: PCT/EP2013/076117
§ 371 (c)(1),
(2) Date: May 28, 2015

(87) PCT Pub. No.: WO2014/090818
PCT Pub. Date: Jun. 19, 2014

(65) Prior Publication Data
US 2015/0307222 A1 Oct. 29, 2015

(30) Foreign Application Priority Data
Dec. 12, 2012 (EP) .................................. 12196784

(51) Int. Cl.
| | |
|---|---|
| B65D 1/02 | (2006.01) |
| C08L 23/14 | (2006.01) |
| C08L 23/16 | (2006.01) |
| C08F 210/06 | (2006.01) |
| B29C 49/00 | (2006.01) |
| C08L 23/10 | (2006.01) |
| B29C 49/04 | (2006.01) |
| B29K 23/00 | (2006.01) |
| C08L 23/08 | (2006.01) |
| C08K 5/00 | (2006.01) |

(52) U.S. Cl.
CPC .......... *B65D 1/0207* (2013.01); *B29C 49/0005* (2013.01); *C08F 210/06* (2013.01); *C08L 23/10* (2013.01); *C08L 23/14* (2013.01); *B29K 2023/14* (2013.01); *C08K 5/0083* (2013.01); *C08L 23/08* (2013.01); *C08L 23/16* (2013.01); *C08L 2203/10* (2013.01); *C08L 2207/02* (2013.01); *C08L 2308/00* (2013.01)

(58) Field of Classification Search
CPC .. B29C 49/0005; B65D 1/0207; C08L 23/14; C08L 23/16; C08L 2203/10; C08L 2207/02
USPC ........................................... 206/524.6
See application file for complete search history.

(56) References Cited

FOREIGN PATENT DOCUMENTS

| | | |
|---|---|---|
| EP | 0586390 B1 | 5/1997 |
| EP | 0591224 B1 | 2/1998 |
| EP | 0887379 A1 | 12/1998 |
| EP | 1028984 B1 | 7/2001 |
| EP | 1211289 A1 | 6/2002 |
| EP | 0491566 B2 | 3/2005 |
| EP | 1183307 B1 | 7/2005 |
| EP | 2492310 A1 | 8/2012 |
| EP | 2508562 A1 | 10/2012 |
| EP | 2546298 A1 | 1/2013 |
| EP | 2573134 A1 | 3/2013 |
| EP | 2733175 A1 | 5/2014 |
| EP | 1873203 B1 | 10/2015 |
| JP | 2004520455 A | 7/2004 |
| JP | 2004520455 A5 | 10/2007 |
| JP | 2015535025 A | 12/2015 |
| JP | 2015535026 A | 12/2015 |
| WO | 8707620 A1 | 12/1987 |
| WO | 9212182 A1 | 7/1992 |
| WO | 9219653 A1 | 11/1992 |
| WO | 9219658 A1 | 11/1992 |
| WO | 9736938 A1 | 10/1997 |
| WO | 9924478 A1 | 5/1999 |
| WO | 9924479 A1 | 5/1999 |
| WO | 2004000899 A1 | 12/2003 |
| WO | 2004111095 A1 | 12/2004 |
| WO | 2014075973 A1 | 5/2014 |

OTHER PUBLICATIONS

Japanese Office Action dated Dec. 18, 2015.
Pasquini, Neil, Polypropylene Handbook, 2nd Edition, 2005, p. 445.
Zweifel, Plastic Additive Handbook, 2001, pp. 871-874.

*Primary Examiner* — Fred M Teskin
(74) *Attorney, Agent, or Firm* — Tarolli, Sundheim, Covell & Tummino LLP

(57) ABSTRACT

Extrusion blow molded bottle comprising a propylene copolymer having a melt flow rate $MFR_2$ (230° C.) of 2.0 to 6.0 g/10 min, a xylene cold soluble content of 20.0 to 40.0 wt.-%, and a comonomer content of more than 4.5 to 12.0 wt.-%, wherein the comonomer content of xylene cold soluble fraction of the extrusion blow molded article is of 16.0 to 28.0 wt.-%.

18 Claims, No Drawings

EXTRUSION BLOW MOLDED BOTTLES

The present invention is directed to a new extrusion blow molded article as well as to the use of a new polypropylene composition to improve the optical properties of an extrusion blow molded article comprising said new polypropylene composition.

It is well known in the polymer field that different applications require specifically tailored polymers to achieve the individual demanding properties. For instance a polymer used for injection molding must necessarily have other properties as a polymer used for blow molding.

The extrusion blow molding process for instance is a very special process that allows in a flexible and cheap way the preparation of different kind of bottles with respect to size and shape. Main drawback in this process is that the solidification step is very special compared to normal injection molding.

In the extrusion blow molding (EBM) process a polymer melt is first extruded through a tubular die into air forming a polymer tube, subsequently blowing up said polymer tube (typically called "parison" in this technical field) until the outside of the tube reaches the boundaries of the mold. To cover the wall of the mold fully with the blown up polymer tube is rather difficult compared to injection molding because the air between polymer tube and mold has to be removed totally which is a demanding process step. Further the inside of the polymer tube is not in contact with the mold and therefore there is only little possibility to influence the inner surface structure of the tube. As a consequence thereof extrusion blown molded articles, like bottles, normally show inferior optical properties compared to any injection molded articles. For instance, the surface property inside and/or outside of extrusion blown bottles is typically non-uniform (flow lines, melt fracture) leading to lower overall gloss and transparency compared to injection molded bottles or injection stretched blown molded articles (ISBM).

Further, it had become clear in the meantime that gloss or transparency should not be the only values to be used for judging the quality of the optical properties of extrusion blow molded articles. For instance it has been recognized that the visual appearance of extrusion blow molded articles is inacceptable even though the gloss values have been rather high. Thus it became clear that the gloss values alone were not enough to judge the optical appearance of the bottles and hence a new parameter, the so-called bottle appearance factor (BAF), was defined as BAF=(clarity*gloss)/haze.

Further the extrusion blow molded (EBM) products shall be rather soft and shall have a rather high melting point which further extends the area of application.

Unfortunately soft polymers quite often have rather high hexane soluble content. However, high amount of hexane extractables are not accepted in the food and health sector. Thus, beside the optical and mechanical properties the hexane soluble content of soft polymers is a critical issue.

Thus there is still the demand for extrusion blow molded (EBM) products with improved optical properties being very soft and contain rather low amount of hexane extractables.

Thus the object of the present invention is to provide an extrusion blow molded article with improved optical properties and low hexane content. Further said extrusion molded article should be rather soft.

The finding of the present invention is to provide an extrusion blow molded article comprising propylene copolymer with rather high overall comonomer content but moderate xylene cold soluble (XCS) content. Further the propylene content in the xylene cold soluble (XCS) fraction should be rather high. A further finding is that especially good results are obtained if the matrix of the propylene copolymer is featured by a bimodal comonomer content and molecular weight distribution.

Accordingly, in a first aspect the present invention is directed to an extrusion blow molded article comprising, preferably comprising at least 75 wt.-% of, more preferably at least 90 wt.-% of, a propylene copolymer (PC), wherein the extrusion blow molded article has (a) a melt flow rate $MFR_2$ (230° C.) measured according to ISO 1133 in the range of 2.0 to 6.0 g/10 min, like in the range of 2.5 to 6.0 g/10 min;

(b) a xylene cold soluble content (XCS) determined according ISO 16152 (25° C.) in the range of 20.0 to 40.0 wt.-% based on the total amount of the extrusion molded article; and (c) a comonomer content in the range of more than 4.5 to 12.0 wt.-%, preferably of more than 4.5 to 11.0 wt.-%, based on the total amount of the extrusion molded article;

wherein further (d) the comonomer content of xylene cold soluble (XCS) fraction of the extrusion blow molded article is in the range of 12.0 to 28.0 wt.-%, preferably in the range of 12.0 to 22.0 wt.-%.

Preferably the propylene copolymer (PC) of said extrusion blow molded article has (a) a melt flow rate $MFR_2$ (230° C.) measured according to ISO 1133 in the range of 2.0 to 6.0 g/10 min, like in the range of 2.5 to 6.0 g/10 min;

(b) a xylene cold soluble content (XCS) determined according ISO 16152 (25° C.) in the range of 20.0 to 40.0 wt.-% based on the total amount of the propylene copolymer (PC); and (c) a comonomer content in the range of more than 4.5 to 12.0 wt.-%, preferably of more than 4.5 to 11.0 wt.-%, based on the total amount of the propylene copolymer (PC);

wherein further (d) the comonomer content of xylene cold soluble (XCS) fraction of the propylene copolymer (PC) is in the range of 12.0 to 28.0 wt.-%, preferably in the range of 12.0 to 22.0 wt.-%.

In a second aspect the present invention is directed to an extrusion blow molded article comprising, preferably comprising at least 75 wt.-% of, more preferably at least 90 wt.-% of, a propylene copolymer (PC), wherein the propylene copolymer (PC) of said extrusion blow molded article has (a) a melt flow rate $MFR_2$ (230° C.) measured according to ISO 1133 in the range of 2.0 to 6.0 g/10 min, like in the range of 2.5 to 6.0 g/10 min;

(b) a xylene cold soluble content (XCS) determined according ISO 16152 (25° C.) in the range of 20.0 to 40.0 wt.-% based on the total amount of the propylene copolymer (PC); and (c) a comonomer content in the range of more than 4.5 to 12.0 wt.-%, preferably of more than 4.5 to 11.0 wt.-%, based on the total amount of the propylene copolymer (PC);

wherein further (d) the comonomer content of xylene cold soluble (XCS) fraction of the propylene copolymer (PC) is in the range of 12.0 to 28.0 wt.-%, preferably in the range of 12.0 to 22.0 wt.-%.

Preferably the extrusion blow molded article of the second aspect has (a) a melt flow rate $MFR_2$ (230° C.) measured according to ISO 1133 in the range of 2.0 to 6.0 g/10 min, like in the range of 2.5 to 6.0 g/10 min;

(b) a xylene cold soluble content (XCS) determined according ISO 16152 (25° C.) in the range of 20.0 to 40.0 wt.-% based on the total amount of the extrusion molded article; and
(c) a comonomer content in the range of more than 4.5 to 12.0 wt.-%, preferably of more than 4.5 to 11.0 wt.-%, based on the total amount of the extrusion molded article;
wherein further
(d) the comonomer content of xylene cold soluble (XCS) fraction of the extrusion blow molded article is in the range of 12.0 to 28.0 wt.-%, preferably in the range of 12.0 to 22.0 wt.-%.

Preferably, the extrusion blow molded article and/or propylene copolymer (PC) according to the first and second embodiment is/are α-nucleated, i.e. comprise(s) an α-nucleating agent.

It has surprisingly been found that such an extrusion blow molded article has very high BAF values and low amount of hexane extractables.

In the following the first aspect and second aspect of the present invention are defined in more detail together.

First the propylene copolymer (PC) being part of the extrusion blow molding article is defined. Subsequently the extrusion molded article is specified as well as the used of the propylene copolymer (PC) to improve the optical properties of the extrusion molded article comprising the propylene copolymer (PC).

Propylene Copolymer (PC)/Heterophasic Propylene Copolymer (RAHECO)

As defined in detail below the instant propylene copolymer (PC) is in a preferred embodiment a heterophasic propylene copolymer (RAHECO) comprising a matrix (M) being a random propylene copolymer (R-PP) and an elastomeric propylene copolymer (E) dispersed in said matrix (M). Accordingly all properties related to the propylene copolymer (PC) are also applicable for the heterophasic propylene copolymer (RAHECO) if not otherwise indicated.

Accordingly, the propylene copolymer (PC), e.g. the heterophasic propylene copolymer (RAHECO), comprises apart from propylene also comonomers. Preferably the propylene copolymer (PC), e.g. the heterophasic propylene copolymer (RAHECO), comprises apart from propylene ethylene and/or $C_4$ to $C_{12}$ α-olefins. Accordingly the term "propylene copolymer (PC)" and the term "heterophasic propylene copolymer (RAHECO)" according to this invention are understood as a polypropylene comprising, preferably consisting of, units derivable from
(a) propylene and
(b) ethylene and/or $C_4$ to $C_{12}$ α-olefins.

Thus the propylene copolymer (PC), e.g. the heterophasic propylene copolymer (RAHECO), comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymer (PC), e.g. the heterophasic propylene copolymer (RAHECO), comprises, especially consists of, monomers copolymerizable with propylene from the group consisting of ethylene, 1-butene and 1-hexene. More specifically the propylene copolymer (PC), e.g. the heterophasic propylene copolymer (RAHECO), comprises—apart from propylene—units derivable from ethylene and/or 1-butene. In a preferred embodiment the propylene copolymer (PC), e.g. the heterophasic propylene copolymer (RAHECO), comprises units derivable from ethylene and propylene only.

Additionally it is appreciated that the propylene copolymer (PC), e.g. the heterophasic propylene copolymer (RAHECO), preferably has a comonomer content in a very specific range which contributes to the softness and good optical properties. Thus it is required that the comonomer content, preferably ethylene content, of the propylene copolymer (PC), e.g. of the heterophasic propylene copolymer (RAHECO), is in the range of 4.5 to 12.0 wt.-%, like in the range of 4.5 to below 12.0 wt.-%, more preferably in the range of 4.5 to 11.0 wt.-%, like in the range of 4.5 to below 11.0 wt.-%, yet more preferably in the range of equal or more than 4.5 to 10.0 wt.-%, still more preferably in the range of more than 5.0 to 9.0 wt.-%, like in the range of 6.0 to 9.0 wt.-%.

The propylene copolymer (PC), e.g. the heterophasic propylene copolymer (RAHECO), can be further defined by the amount of comonomers within the xylene cold soluble (XCS) fraction. Accordingly it is preferred that the comonomer content, preferably ethylene content, in the xylene cold soluble fraction (XCS) of the propylene copolymer (PC), e.g. of the heterophasic propylene copolymer (RAHECO), is in the range of 12.0 to 28.0 wt.-%, yet more preferably in the range of 12.0 to 22.0 wt.-%, still more preferably in the range of 14.0 to 20.0 wt.-%, yet more preferably in the range of 15.0 to 19.0 wt.-%.

Concerning the comonomers present in the xylene cold soluble fraction (XCS) it is referred to the information provided for the propylene copolymer (PC), e.g. for the heterophasic propylene copolymer (RAHECO). Accordingly in a specific embodiment the xylene cold soluble fraction (XCS) comprises, especially consists of, monomers copolymerizable with propylene from the group consisting of ethylene, 1-butene and 1-hexene. More specifically the xylene cold soluble fraction (XCS) comprises—apart from propylene— units derivable from ethylene and/or 1-butene. In a preferred embodiment the xylene cold soluble fraction (XCS) comprises units derivable from ethylene and propylene only.

Considering the information provided above, it is preferred that the propylene copolymer (PC), e.g. the heterophasic propylene copolymer (RAHECO), fulfills inequation (I), more preferably inequation (Ia), yet more preferably inequation (Ib), still more preferably inequation (Ic), $$\frac{Co(\text{total})}{Co(XCS)} \leq 0.55, \tag{I}$$

$$\frac{Co(\text{total})}{Co(XCS)} \leq 0.50, \tag{Ia}$$

$$0.20 \leq \frac{Co(\text{total})}{Co(XCS)} \leq 0.55, \tag{Ib}$$

$$0.30 \leq \frac{Co(\text{total})}{Co(XCS)} \leq 0.50, \tag{Ic}$$

wherein
Co (total) is the comonomer content [wt.-%] of the propylene copolymer (PC), e.g. of the heterophasic propylene copolymer (RAHECO);
Co (XCS) is the comonomer content [wt.-%] of the xylene cold soluble fraction (XCS) of the propylene copolymer (PC), e.g. of the heterophasic propylene copolymer (RAHECO).

In a further preferred embodiment the propylene copolymer (PC), e.g. the heterophasic propylene copolymer (RAHECO), is additionally or alternatively defined by the rather overall comonomer content to its xylene cold soluble (XCS) fraction. Accordingly it is preferred that the propylene copolymer (PC), e.g. the heterophasic propylene copolymer (RAHECO), fulfills inequation (II), more preferably inequation (IIa), yet more preferably inequation (IIb), $$\frac{Co(\text{total})}{XCS} \leq 0.35 \qquad (II)$$

$$0.21 \leq \frac{Co(\text{total})}{XCS} \leq 0.32, \qquad (IIa)$$

$$0.22 \leq \frac{Co(\text{total})}{XCS} \leq 0.29, \qquad (IIb)$$

wherein
Co (total) is the comonomer content [wt.-%] of the propylene copolymer (PC), e.g. of the heterophasic propylene copolymer (RAHECO);
XCS is the content of the xylene cold soluble fraction (XCS) [wt.-%] of the propylene copolymer (PC), e.g. of the heterophasic propylene copolymer (RAHECO).

Further it is appreciated that the xylene cold soluble (XCS) fraction of the propylene copolymer (PC), e.g. of the heterophasic propylene copolymer (RAHECO), is specified by its intrinsic viscosity. A low intrinsic viscosity (IV) value reflects a low weight average molecular weight. For the present invention it is preferably required that the xylene cold soluble fraction (XCS) of the propylene copolymer (PC), e.g. of the heterophasic propylene copolymer (RAHECO), has an intrinsic viscosity (IV) in the range of 1.3 to 3.0 dl/g, like in the range of 1.5 to 3.0 dl/g, more preferably in the range of 1.7 to below 2.8 dl/g, still more preferably in the range of 1.8 to 2.7 dl/g.

Additionally or alternatively the xylene cold soluble fraction (XCS) of the propylene copolymer (PC), e.g. of the heterophasic propylene copolymer (RAHECO), has a polydispersity (Mw/Mn) in the range of more than 3.5 to 8.0, more preferably in the range of 4.0 to 7.5, still more preferably in the range of 4.5 to 7.0.

Another characteristic feature of the propylene copolymer (PC), e.g. of the heterophasic propylene copolymer (RAHECO), is its rather moderate xylene cold soluble (XCS) fraction. Accordingly it is appreciated that the propylene copolymer (PC), e.g. the heterophasic propylene copolymer (RAHECO), has a xylene cold soluble fraction in the range of 20.0 to 40.0 wt.-%, preferably in the range of 22.0 to 35.0 wt.-%, like in the range of 25.0 to below 34.0 wt.-%, even more preferably in the range of 27.0 to 33.5 wt.-%.

The part of the propylene copolymer (PC), e.g. of the heterophasic propylene copolymer (RAHECO), which is not soluble in cold xylene is the xylene cold insoluble (XCI) fraction. Preferably also this fraction preferably exhibits some specific properties.

Accordingly it is preferred that the xylene cold insoluble fraction (XCI) of the propylene copolymer (PC), e.g. of the heterophasic propylene copolymer (RAHECO), has an intrinsic viscosity (IV) of equal or above 1.8 dl/g, more preferably of in the range of 1.8 to below 3.0 dl/g, still more preferably in the range of 1.8 to 2.7 dl/g, yet more preferably in the range of 1.9 to 2.6 dl/g.

Accordingly it is preferred the intrinsic viscosity of the xylene cold soluble (XCS) fraction and of the xylene cold insoluble (XCI) fraction are rather similar. Thus it is preferred that the propylene copolymer (PC), e.g. the heterophasic propylene copolymer (RAHECO), fulfills inequation (III) more preferably inequation (IIIa), yet more preferably inequation (IIIb), $$0.80 \leq \frac{IV(XCS)}{IV(XCI)} \leq 1.30 \qquad (III)$$

$$0.85 \leq \frac{IV(XCS)}{IV(XCI)} \leq 1.25 \qquad (IIIa)$$

$$0.90 \leq \frac{IV(XCS)}{IV(XCI)} \leq 1.20 \qquad (IIIb)$$

wherein
IV (XCS) is the intrinsic viscosity (IV) [dl/g] of the xylene cold soluble (XCS) of the propylene copolymer (PC), e.g. of the heterophasic propylene copolymer (RAHECO);
IV (XCI) is the intrinsic viscosity (IV) [dl/g] of the xylene cold insoluble (XCI) of the propylene copolymer (PC), e.g. of the heterophasic propylene copolymer (RAHECO).

Preferably the xylene cold insoluble fraction (XCI) of the propylene copolymer (PC), e.g. of the heterophasic propylene copolymer (RAHECO), has a melt flow rate $MFR_2$ (230° C.) in the range of 2.0 to 6.0 g/10 min, e.g. more than 2.0 to 6.0 g/10 min, more preferably in the range of 2.5 to 6.0 g/10 min, e.g. more than 2.5 to 5.0 g/10 min, still more preferably in the range of 2.0 to 5.0 g/10 min, e.g. more than 2.0 to 5.0 g/10 min, yet more preferably in the range of 2.5 to 4.5 g/10 min, i.e. more than 2.5 to 4.5 g/10 minm.

Additionally or alternatively the cold insoluble fraction (XCI) of the propylene copolymer (PC), e.g. of the heterophasic propylene copolymer (RAHECO), has a polydispersity (Mw/Mn) in the range of more than 3.5 to 8.0, more preferably in the range of 4.0 to 7.5, still more preferably in the range of 4.5 to 7.0.

Accordingly it is preferred the polydispersity (Mw/Mn) of the xylene cold soluble (XCS) fraction and of the xylene cold insoluble (XCI) fraction are rather similar. Thus it is preferred that the propylene copolymer (PC), e.g. the heterophasic propylene copolymer (RAHECO), fulfills inequation (IV) more preferably inequation (IVa), yet more preferably inequation (IVb), $$0.70 \leq \frac{P(XCS)}{P(XCI)} \leq 1.35 \qquad (IV)$$

$$0.80 \leq \frac{P(XCS)}{P(XCI)} \leq 1.30 \qquad (IVa)$$

$$0.85 \leq \frac{P(XCS)}{P(XCI)} \leq 1.25 \qquad (IVb)$$

wherein
P (XCS) is the polydispersity (Mw/Mn) of the xylene cold soluble (XCS) of the propylene copolymer (PC), e.g. of the heterophasic propylene copolymer (RAHECO);
P (XCI) is the polydispersity (Mw/Mn) of the xylene cold soluble (XCS) of the propylene copolymer (PC), e.g. of the heterophasic propylene copolymer (RAHECO).

In one preferred embodiment the comonomer content, preferably ethylene content, in the cold insoluble fraction (XCI) of the propylene copolymer (PC), e.g. of the heterophasic propylene copolymer (RAHECO), is in the range of 2.0 to 7.0 wt.-%, yet more preferably in the range of 2.0 to 6.0 wt.-%, still more preferably in the range of 2.5 to 5.0 wt.-%.

Further it is preferred that the comonomer content, preferably ethylene content, in both fractions is in a specific ratio to each other. Accordingly it is preferred that the propylene copolymer (PC), e.g. the heterophasic propylene copolymer (RAHECO), fulfills inequation (V) more preferably inequation (Va), yet more preferably inequation (Vb), still more preferably inequation (Vc), $$2.8 \leq \frac{Co(XCS)}{Co(XCI)} \leq 6.0 \qquad (V)$$

$$2.8 \leq \frac{Co(XCS)}{Co(XCI)} \leq 5.5 \qquad (Va)$$

$$3.0 \leq \frac{Co(XCS)}{Co(XCI)} \leq 5.0 \qquad (Vb)$$

$$3.2 \leq \frac{Co(XCS)}{Co(XCI)} \leq 4.8 \qquad (Vc)$$

wherein
Co (XCS) is the comonomer content [wt.-%] of the xylene cold soluble (XCS) of the propylene copolymer (PC), e.g. of the heterophasic propylene copolymer (RAHECO);
Co (XCI) is the comonomer content [wt.-%] of the xylene cold insoluble (XCI) of the propylene copolymer (PC), e.g. of the heterophasic propylene copolymer (RAHECO).

Preferably it is desired that the propylene copolymer (PC), e.g. the heterophasic propylene copolymer (RAHECO), is thermo mechanically stable, so that for instance a thermal sterilization process can be accomplished. Accordingly it is appreciated that the propylene copolymer (PC), e.g. the heterophasic propylene copolymer (RAHECO), has a melting temperature of at least 145° C., like 145 to 160° C., more preferably in the range of 146 to 159° C., still more preferably in the range of 148 to 158° C., like in the range of 148 to 155° C.

The propylene copolymer (PC), e.g. the heterophasic propylene copolymer (RAHECO), has a melt flow rate $MFR_2$ (230° C.) in the range of 2.0 to 6.0 g/10 min, e.g. more than 2.0 to 6.0 g/10 min, more preferably in the range of 2.0 to 5.0 g/10 min, e.g. more than 2.0 to 5.0 g/10 min, still more preferably in the range of 2.5 to 4.5 g/10 min, i.e. more than 2.5 to 4.5 g/10 min.

The propylene copolymer (PC), e.g. the heterophasic propylene copolymer (RAHECO), is especially further featured by its specific optical properties. Accordingly the propylene copolymer (PC), e.g. the heterophasic propylene copolymer (RAHECO), has a bottle appearance factor (BAF) before sterilization of formula (I), preferably (Ia), more preferably (Ib), $$BAF = \frac{C \times G}{H} > 70 \qquad (I)$$

$$BAF = \frac{C \times G}{H} > 110 \qquad (Ia)$$

$$BAF = \frac{C \times G}{H} > 150 \qquad (Ib)$$

wherein
H is the haze value
C is the clarity value,
G is the gloss value,
wherein further
the haze, the clarity and the gloss are determined according to ASTM D 1003-07 on a test specimen of 0.3×60×60 mm³ size cut from a bottle having a wall thickness of 0.3 mm made from the propylene copolymer (PC), e.g. from the heterophasic propylene copolymer (RAHECO).

Additionally or alternatively, the propylene copolymer (PC), e.g. the heterophasic propylene copolymer (RAHECO), has a bottle appearance factor (BAF) after sterilization of formula (II), preferably (IIa), more preferably (IIb), $$BAF = \frac{C \times G}{H} > 30 \qquad (II)$$

$$BAF = \frac{C \times G}{H} > 40 \qquad (IIa)$$

$$BAF = \frac{C \times G}{H} > 50 \qquad (IIb)$$

wherein
H is the haze value
C is the clarity value,
G is the gloss value,
wherein further
the haze, the clarity and the gloss are determined according to ASTM D 1003-07 on a test specimen of 0.3×60×60 mm³ size cut from a sterilized bottle (as described in the example section) having a wall thickness of 0.3 mm made from the propylene copolymer (PC), e.g. from the heterophasic propylene copolymer (RAHECO).

Further it is preferred that the propylene copolymer (PC), e.g. the heterophasic propylene copolymer (RAHECO), has an hexane soluble content of below 10.0 wt.-%, more preferably in the range of above 0.5 to below 8.0 wt.-%, still more preferably in the range of 2.0 to 6.0 wt.-%, yet more preferably in the range of 2.5 to below 5.5 wt.-%, still yet more preferably in the range of 2.5 to 5.2 wt.-%, like in the range of 2.5 to 5.0 wt.-%.

As indicated above, the propylene copolymer (PC) is featured by a considerable amount of a xylene cold soluble (XCS) fraction. On the other hand the propylene copolymer (PC) is also preferably featured by a rather high amount of a crystalline fraction melting at high temperature. Accordingly the propylene copolymer (PC) is a mixture of a crystalline polymer and amorphous material. Such type of polymer is classified as heterophasic propylene copolymer. A heterophasic propylene copolymer comprises a polymer matrix, like a (semi)crystalline polypropylene, in which the amorphous material, like an elastomeric propylene copolymer, is dispersed. Thus in a preferred embodiment the propylene copolymer (PC) is heterophasic propylene copolymer (RAHECO). More precisely the propylene copolymer (PC) is heterophasic propylene copolymer (RAHECO) comprising a matrix (M) being a random propylene copolymer (R-PP) and dispersed therein an elastomeric propylene copolymer (E). Thus the matrix (M) contains (finely) dispersed inclusions being not part of the matrix (M) and said inclusions contain the elastomeric propylene copolymer (E). The term "inclusion" according to this invention shall preferably indicate that the matrix (M) and the inclusion form different phases within the heterophasic propylene copolymer (RAHECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably the heterophasic propylene copolymer (RAHECO) according to this invention comprises as polymer components only the random propylene copolymer (R-PP) and the elastomeric propylene copolymer (E). In other words the heterophasic propylene copolymer (RAHECO) may contain further additives, especially α-nucleating agents, but no other polymer in an amount exceeding 5 wt.-%, more preferably exceeding 3 wt.-%, like exceeding 1 wt.-%, based on the total heterophasic propylene copolymer (RAHECO). One additional polymer which may be present in such low amounts is a polyethylene which is a by-reaction product obtained by the preparation of heterophasic propylene copolymer (RAHECO) (see in detail below). Accordingly it is in particular appreciated that the instant heterophasic propylene copolymer (RAHECO) contains only the random propylene copolymer (R-PP), the elastomeric propylene copolymer (E) and optionally polyethylene in amounts as mentioned in this paragraph.

Preferably the weight ratio between the matrix (M), i.e. the random propylene copolymer (R-PP), and the elastomeric propylene copolymer (E) is 60/40 to 90/10, more preferably 70/30 to 85/15, yet more preferably 75/25 to 85/15.

In the following the random propylene copolymer (R-PP) and the elastomeric propylene copolymer (E) are defined more precisely.

The random propylene copolymer (R-PP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

The comonomer content of the random propylene copolymer (R-PP) is not more than 7.0 wt.-%, more preferably not more than 6.0 wt.-%, still more preferably in the range of 1.0 to 7.0 wt.-%, yet more preferably in the range of 1.5 to 6.0 wt.-%, still more preferably in the range of 2.5 to 6.0 wt.-%, like in the range of 3.0 to below 5.5 wt.-%.

Further it is appreciated that the heterophasic propylene copolymer (RAHECO) fulfills inequation (VI), more preferably inequation (VIa), yet more preferably inequation (VIb), still more preferably inequation (VIc), still yet more preferably inequation (VId), $$\frac{Co(\text{total})}{Co(RPP)} \geq 1.3, \quad \text{(VI)}$$

$$\frac{Co(\text{total})}{Co(RPP)} \geq 1.4, \quad \text{(VIa)}$$

$$4.0 \geq \frac{Co(\text{total})}{Co(RPP)} \geq 1.3, \quad \text{(VIb)}$$

$$3.5 \geq \frac{Co(\text{total})}{Co(RPP)} \geq 1.4, \quad \text{(VIc)}$$

$$3.0 \geq \frac{Co(\text{total})}{Co(RPP)} \geq 1.4, \quad \text{(VId)}$$

wherein
Co (total) is the comonomer content [wt.-%] of heterophasic propylene copolymer (RAHECO),
Co (RPP) is the comonomer content [wt.-%] of the random propylene copolymer (R-PP).

The term "random" indicates that the comonomers of the random propylene copolymer (R-PP), as well as of the first propylene copolymer fraction (R-PP1) and the second propylene copolymer fraction (R-PP2) are randomly distributed within the propylene copolymers. The term random is understood according to IUPAC (Glossary of basic terms in polymer science; IUPAC recommendations 1996).

The comonomer content of the matrix (M), i.e. of the random propylene copolymer (R-PP), has also impact on the amount of xylene cold solubles in the matrix (M). Thus it is preferred that the amount of the xylene cold soluble (XCS) fraction of the matrix (M), i.e. of the random propylene copolymer (R-PP), is equal or below 20.0 wt.-%, preferably is in the range of 5.0 to equal or below 20.0 wt.-%, more preferably is in the range of 8.0 to equal or below 20.0 wt.-%, like in the range of 10.0 to 19.0 wt.-%.

The random propylene copolymer (R-PP) preferably comprises at least two polymer fractions, like two or three polymer fraction, all of them are propylene copolymers. Preferably the random propylene copolymer (R-PP) comprises at least two different random propylene copolymer fractions, like two different random propylene copolymer fractions, wherein further the two random propylene copolymer fractions differ in the comonomer content.

Preferably one fraction of the two random polymer copolymer fractions of the random propylene copolymer (R-PP) is the commoner lean fraction and the other fraction is the comonomer rich fraction, wherein further the comonomer lean fraction and the comonomer rich fraction fulfils inequation (VII), more preferably inequation (VIIa), still more preferably inequation (VIIb), $$\frac{Co(\text{lean})}{Co(\text{rich})} \leq 0.60, \quad \text{(VII)}$$

$$0.10 \leq \frac{Co(\text{lean})}{Co(\text{rich})} \leq 0.50, \quad \text{(VIIa)}$$

$$0.15 \leq \frac{Co(\text{lean})}{Co(\text{rich})} \leq 0.45 \quad \text{(VIIb)}$$

wherein
Co (lean) is the comonomer content [wt.-%] of the random propylene copolymer fraction with the lower comonomer content, i.e. the comonomer lean fraction;
Co (rich) is the comonomer content [wt.-%] of the random propylene copolymer fraction with the higher comonomer content, comonomer rich fraction.

Even more preferred the random propylene copolymer (R-PP) comprises, preferably consists of, a first propylene copolymer fraction (R-PP1) and a second propylene copolymer fraction (R-PP2), wherein further the first propylene copolymer fraction (R-PP1) and the second propylene copolymer fraction (R-PP2) differ in the comonomer content.

Thus in one embodiment the first random propylene copolymer fraction (R-PP1) has a higher comonomer content than the second random propylene copolymer fraction (R-PP2).

In another embodiment the second random propylene copolymer fraction (R-PP2) has a higher comonomer content than the first random propylene copolymer fraction (R-PP1).

Thus it is especially preferred that the first random propylene copolymer fraction (R-PP1) and the second random propylene copolymer fraction (R-PP2) fulfill together the inequation (VIII), more preferably inequation (VIIIa), still more preferably inequation (VIIIb), $$\frac{Co(R-PP1)}{Co(R-PP2)} \leq 0.60, \quad \text{(VIII)}$$

$$0.10 \leq \frac{Co(R-PP1)}{Co(R-PP2)} \leq 0.50, \quad \text{(VIIIa)}$$

$$0.15 \leq \frac{Co(R-PP1)}{Co(R-PP2)} \leq 0.45 \quad \text{(VIIIb)}$$

wherein

Co (R-PP1) is the comonomer content [wt.-%] of the first random propylene copolymer fraction (R-PP1), Co (R-PP2) is the comonomer content [wt.-%] of the second random propylene copolymer fraction (R-PP2).

Thus it is preferred that the first random propylene copolymer fraction (R-PP1) has a comonomer content of equal or below 4.0 wt.-%, more preferably of equal or below 3.5 wt.-%, yet more preferably in the range 0.2 to 4.0 wt.-%, still more preferably in the range 0.5 to 3.5 wt.-%, like in the range of 1.0 to 3.0 wt.-%.

On the other hand the second random propylene copolymer fraction (R-PP2) preferably has a comonomer content in the range of 1.0 to 12.0 wt.-%, still more preferably in the range 1.5 to 10.0 wt.-%, yet more preferably in the range 2.5 to 9.0 wt.-%, with the proviso that the comonomer content of the second random propylene copolymer fraction (R-PP2) is higher, at least 2.5 wt.-%, more preferably at least 3.0 wt.-%, like 3.0 to 7.0 wt.-%, higher than the comonomer content of the first random propylene copolymer fraction (R-PP1).

The comonomers of the first random propylene copolymer fraction (R-PP1) and second random propylene copolymer fraction (R-PP2), respectively, copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the first random propylene copolymer fraction (R-PP1) and second random propylene copolymer fraction (R-PP2), respectively, comprise, especially consist of, monomers copolymerizable with propylene from the group consisting of ethylene, 1-butene and 1-hexene. More specifically the first random propylene copolymer fraction (R-PP1) and second random propylene copolymer fraction (R-PP2), respectively, comprise—apart from propylene—units derivable from ethylene and/or 1-butene. In a preferred embodiment the first random propylene copolymer fraction (R-PP1) and the second random propylene copolymer fraction (R-PP2) comprise the same comonomers, i.e. ethylene only.

Preferably the weight ratio between the first random propylene copolymer fraction (R-PP1) and the second random propylene copolymer fraction (R-PP2) is 20/80 to 80/20, more preferably 30/70 to 70/30, like 40/60 to 60/40.

As mentioned above a further component of the heterophasic propylene copolymer (RAHECO) is the elastomeric propylene copolymer (E) dispersed in the matrix (M), i.e. in the random propylene copolymer (R-PP). Concerning the comonomers used in the elastomeric propylene copolymer (E) it is referred to the information provided for the heterophasic propylene copolymer (RAHECO) and the random propylene copolymer (R-PP), respectively. Accordingly the elastomeric propylene copolymer (E) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer (E) comprises units derivable from ethylene and propylene only. It is especially preferred that the random propylene copolymer (R-PP) and the elastomeric propylene copolymer (E) comprises the same comonomers. Accordingly in one specific embodiment the random propylene copolymer (R-PP) and the elastomeric propylene copolymer (E) comprise propylene and ethylene only.

The comonomer content of the elastomeric propylene copolymer (E) preferably is not more than 38.0 wt.-%, like in the range of 12 to 38 wt.-%, more preferably in the range of 12.0 to 25.0 wt.-%, yet more preferably in the range of more than 14.0 to 22.0 wt.-%, even more preferably in the range of more than 15.0 to 20.0 wt.-%.

As mentioned in detail below the final propylene copolymer (PC), e.g. the final heterophasic propylene copolymer (RAHECO), is preferably the result of a vis-braking step. Accordingly the random propylene copolymer (R-PP) as well as its individual fractions and the elastomeric propylene copolymer (E) are not as such obtainable. However, the random propylene copolymer (R-PP), the first random propylene copolymer fraction (R-PP1) as well as the heterophasic propylene copolymer (RAHECO) can be obtained prior to vis-braking from the polymerization process as defined below. From these non vis-broken materials the comonomer content can be analyzed. In turn the comonomer content of the second random propylene copolymer fraction (R-PP2) can be calculated from the comonomer values measured form the random propylene copolymer (R-PP) and the first random propylene copolymer fraction (R-PP1) and the comonomer content of the elastomeric propylene copolymer (E) can be calculated from the comonomer values measured form the random propylene copolymer (R-PP) and the heterophasic propylene copolymer (RAHECO). The vis-breaking step does not alter the comonomer content in the random propylene copolymer (R-PP), the first random propylene copolymer fraction (R-PP1), the second random propylene copolymer fraction (R-PP2), and the elastomeric propylene copolymer (E).

The propylene copolymer, i.e. the heterophasic propylene copolymer (RAHECO), as defined in the instant invention may contain up to 5.0 wt.-% additives, like α-nucleating agents and antioxidants, as well as slip agents and antiblocking agents. Preferably the additive content is below 3.0 wt.-%, like below 1.0 wt.-%

Preferably the propylene copolymer (PC), e.g. the final heterophasic propylene copolymer (RAHECO), comprises an α-nucleating agent. Even more preferred the present invention is free of β-nucleating agents. Accordingly, the α-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate], and (iv) vinylcycloalkane polymer and vinylalkane polymer (as discussed in more detail below), and
(v) mixtures thereof.

Such additives are generally commercially available and are described, for example, in "Plastic Additives Handbook", pages 871 to 873, 5th edition, 2001 of Hans Zweifel.

Preferably the propylene copolymer (PC), e.g. the final heterophasic propylene copolymer (RAHECO), contains up to 5 wt.-% of the α-nucleating agent. In a preferred embodiment, the propylene copolymer (PC), e.g. the final heterophasic propylene copolymer (RAHECO), contains not more than 200 ppm, more preferably of 1 to 200 ppm, more preferably of 5 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

It is especially preferred that the propylene copolymer (PC), e.g. the final heterophasic propylene copolymer (RAHECO), contains a vinylcycloalkane, like vinylcyclohexane (VCH), polymer and/or vinylalkane polymer. In one specific embodiment the propylene copolymer (PC), e.g. the final heterophasic propylene copolymer (RAHECO), contains a vinylcycloalkane, like vinylcyclohexane (VCH), polymer and/or vinylalkane polymer. Preferably the vinylcycloalkane is vinylcyclohexane (VCH) polymer is introduced into the propylene copolymer (PC), e.g. into the final heterophasic propylene copolymer (RAHECO), by the BNT technology.

The propylene copolymer (PC), e.g. the final heterophasic propylene copolymer (RAHECO), is preferably obtained by a specific process. Accordingly the propylene copolymer (PC), e.g. the final heterophasic propylene copolymer (RAHECO), is preferably obtained by a sequential polymerization process comprising the steps of
(a) polymerizing in a first reactor (R1)
   propylene and
   ethylene and/or a C4 to C12 α-olefin, preferably ethylene, obtaining a first polymer fraction, i.e. a first random propylene copolymer fraction (R-PP1),
(b) transferring the first polymer fraction, i.e. the first random propylene copolymer fraction (R-PP1), into a second reactor (R2),
(c) polymerizing in said second reactor (R2) in the presence of the first polymer fraction, i.e. of the first random propylene copolymer fraction (R-PP1),
   propylene and
   ethylene and/or a C4 to C12 α-olefin, preferably ethylene, obtaining a second polymer fraction, i.e. a second random propylene copolymer fraction (R-PP2), the first and second polymer fraction form the random propylene copolymer (R-PP),
(d) transferring said random propylene copolymer (R-PP), into a third reactor (R3),
(e) polymerizing in said third reactor (R3) in the presence of the random propylene copolymer (R-PP),
   propylene and
   ethylene and/or a C4 to C12 α-olefin, preferably ethylene, obtaining a third polymer fraction, said third polymer fraction is the elastomeric propylene copolymer (E); the third polymer fraction and the random propylene copolymer (R-PP), form the propylene copolymer, i.e. the heterophasic propylene copolymer (RAHECO),
(f) removing the propylene copolymer from the third reactor (R3), and
(g) optionally visbreaking said propylene copolymer, i.e. said heterophasic propylene copolymer (RAHECO).

Preferably between the second reactor (R2), and the third reactor (R3) the monomers are flashed out.

The term "sequential polymerization process" indicates that the propylene copolymer (PC), e.g. the final heterophasic propylene copolymer (RAHECO), is produced in at least three reactors, preferably in three reactors, connected in series. Accordingly the present process comprises at least a first reactor (R1), a second reactor (R2), and a third reactor (R3). The term "polymerization reactor" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization reactors.

As stated above in the first two reactors the matrix (M), i.e. the random propylene copolymer (R-PP) is produced. More precisely, in the first reactor (R1) the first random propylene copolymer fraction (R-PP1) is produced whereas in the second reactor (R2) the second random propylene copolymer fraction (R-PP2).

The preferred comonomers used in the first reactor (R1) are the same as indicated above, for the first random propylene copolymer fraction (R-PP1). Accordingly especially preferred comonomers are ethylene, 1-butene and 1-hexene. In one specific embodiment the comonomer is ethylene.

Preferably the weight ratio between the first random propylene copolymer fraction (R-PP1) and the second random propylene copolymer fraction (R-PP2) is 20/80 to 80/20, more preferably 30/70 to 70/30, yet more preferably 40/60 to 60/40.

Accordingly in the first reactor (R1) a first random propylene copolymer fraction (R-PP1) is produced whereas in the second rector (R2) the second random propylene copolymer fraction (R-PP2) is produced obtaining thereby the random propylene copolymer (R-PP).

The comonomers of the random propylene copolymer (R-PP), of the first random propylene copolymer fraction (R-PP1), and of the second random propylene copolymer fraction (R-PP2) copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP), the first random propylene copolymer fraction (R-PP1), and the second random propylene copolymer fraction (R-PP2) comprise, especially consist of, monomers copolymerizable with propylene from the group consisting of ethylene, 1-butene and 1-hexene. More specifically the random propylene copolymer (R-PP), the first random propylene copolymer fraction (R-PP1) and the second random propylene copolymer fraction (R-PP2) comprise—apart from propylene—units derivable from ethylene and/or 1-butene. In a preferred embodiment the random propylene copolymer (R-PP), the first random propylene copolymer fraction (R-PP1) and the second random propylene copolymer fraction (R-PP2) comprise the same comonomers, i.e. ethylene only.

Further the first random propylene copolymer fraction (R-PP1), i.e. the polymer of the first reactor (R1), has preferably a xylene cold soluble (XCS) fraction of equal or below than 10.0 wt.-%, more preferably in the range of 1.0 to 10.0 wt.-%, still more preferably in the range of 2.0 to 9.0 wt.-%, yet more preferably in the range of 2.5 to 8.0 wt.-%.

On the other hand the second random propylene copolymer fraction (R-PP2), i.e. the polymer produced in the second reactor (R2), preferably has a xylene cold soluble (XCS)

fraction of equal or less than 40 wt.-%, more preferably in the range of 2.0 to 35 wt.-%, still more preferably in the range of 3.0 to 30 wt.-%.

Accordingly the overall xylene cold soluble (XCS) content in the second reactor, i.e. the xylene cold soluble (XCS) fraction of the random propylene copolymer (R-PP), preferably equal or below than 20.0 wt.-%, more preferably is in the range of 5.0 to equal or below 20.0 wt.-%, still more preferably in the range of 8.0 to equal or below 20.0 wt.-%, even more preferably is in the range of 10.0 to 19.0 wt.-%.

Preferably the first random propylene copolymer fraction (R-PP1) has a melt flow rate MFR$_2$ (230° C.) in the range of in the range of 0.3 to 7.0 g/10 min, more preferably in the range 1.0 to 5.5 g/10 min, yet more preferably in the range of 1.0 to 4.5 g/10 min.

Preferably the second random propylene copolymer fraction (R-PP2) preferably has a melt flow rate MFR$_2$ (230° C.) in the range of in the range of 0.1 to 5.5 g/10 min, more preferably in the range 0.3 to 4.5 g/10 min.

Accordingly, the random propylene copolymer (R-PP) preferably comprises at least two polymer fractions, like two or three polymer fraction, all of them are propylene copolymers. Preferably the random propylene copolymer (R-PP) comprises at least two different random propylene copolymer fractions, like two different random propylene copolymer fractions, i.e. a first random propylene copolymer fraction (R-PP1) and a second random propylene copolymer fraction (R-PP2), wherein further the two random propylene copolymer fractions differ in the comonomer content and/or in the melt flow rate MFR$_2$ (230° C.), preferably differ in the comonomer content and in the melt flow rate MFR$_2$ (230° C.).

Preferably one fraction of the two random polymer copolymer fractions of the random propylene copolymer (R-PP) is the commoner lean fraction and the other fraction is the comonomer rich fraction, wherein further the comonomer lean fraction and the comonomer rich fraction fulfils inequation (VII), more preferably inequation (VIIa), still more preferably inequation (VIIb), $$\frac{Co(\text{lean})}{Co(\text{rich})} \leq 0.60, \tag{VII}$$

$$0.10 \leq \frac{Co(\text{lean})}{Co(\text{rich})} \leq 0.50, \tag{VIIa}$$

$$0.15 \leq \frac{Co(\text{lean})}{Co(\text{rich})} \leq 0.45 \tag{VIIb}$$

wherein

Co (lean) is the comonomer content [wt.-%] of the random propylene copolymer fraction with the lower comonomer content, i.e. the comonomer lean fraction;

Co (rich) is the comonomer content [wt.-%] of the random propylene copolymer fraction with the higher comonomer content, comonomer rich fraction.

In addition or alternatively to inequation (VII) one fraction of the two random polymer copolymer fractions of the random propylene copolymer (R-PP is the low melt flow rate MFR$_2$ (230° C.) fraction and the other fraction is the high melt flow rate MFR$_2$ (230° C.) fraction, wherein further the low flow fraction and the high flow fraction fulfils inequation (IX), more preferably inequation (IXa), still more preferably inequation (IXb), $$\frac{MFR(\text{high})}{MFR(\text{low})} \geq 1.80 \tag{IX}$$

$$15.0 \geq \frac{MFR(\text{high})}{MFR(\text{low})} \geq 2.50 \tag{IXa}$$

$$12.0 \geq \frac{MFR(\text{high})}{MFR(\text{low})} \geq 4.50 \tag{IXb}$$

wherein

MFR (high) is the melt flow rate MFR$_2$ (230° C.) [g/10 min] of the random propylene copolymer fraction with the higher melt flow rate MFR$_2$ (230° C.), MFR (low) is the melt flow rate MFR$_2$ (230° C.) [g/10 min] of the random propylene copolymer fraction with the lower melt flow rate MFR$_2$ (230° C.).

Even more preferred the random propylene copolymer (R-PP) comprises, preferably consists of, a first propylene copolymer fraction (R-PP1) and a second propylene copolymer fraction (R-PP2), wherein further the first propylene copolymer fraction (R-PP1) and the second propylene copolymer fraction (R-PP2) differ in the comonomer content and/or in the melt flow rate MFR$_2$ (230° C.), preferably differ in the comonomer content and in the melt flow rate MFR$_2$ (230° C.).

Thus in one embodiment the first random propylene copolymer fraction (R-PP1) has a higher comonomer content and melt flow rate MFR$_2$ (230° C.) than the second random propylene copolymer fraction (R-PP2).

In another embodiment the second random propylene copolymer fraction (R-PP2) has a higher comonomer content and melt flow rate MFR$_2$ (230° C.) than the first random propylene copolymer fraction (R-PP1).

In still another embodiment the first random propylene copolymer fraction (R-PP1) has a higher comonomer content but a lower melt flow rate MFR$_2$ (230° C.) than the second random propylene copolymer fraction (R-PP2).

In further embodiment the second random propylene copolymer fraction (R-PP2) has a higher comonomer content but a lower melt flow rate MFR$_2$ (230° C.) than the first random propylene copolymer fraction (R-PP1).

Thus it is especially preferred that the first random propylene copolymer fraction (R-PP1) and the second random propylene copolymer fraction (R-PP2) fulfill together the inequation (VIII), more preferably inequation (VIa), still more preferably inequation (VIIIb), $$\frac{Co(R-PP1)}{Co(R-PP2)} \leq 0.60, \tag{VIII}$$

$$0.10 \leq \frac{Co(R-PP1)}{Co(R-PP2)} \leq 0.50, \tag{VIIIa}$$

$$0.15 \leq \frac{Co(R-PP1)}{Co(R-PP2)} \leq 0.45 \tag{VIIIb}$$

wherein

Co (R-PP1) is the comonomer content [wt.-%] of the first random propylene copolymer fraction (R-PP1), Co (R-PP2) is the comonomer content [wt.-%] of the second random propylene copolymer fraction (R-PP2).

In addition or alternatively to inequation (VIII) the first random propylene copolymer fraction (R-PP1) and the second random propylene copolymer fraction (R-PP2) fulfill together the inequation (X), more preferably inequation (Xa), still more preferably inequation (Xb), $$\frac{MFR(R-PP1)}{MFR(R-PP2)} \geq 1.80 \qquad (X)$$

$$15.0 \geq \frac{MFR(R-PP1)}{MFR(R-PP2)} \geq 2.50 \qquad (Xa)$$

$$12.0 \geq \frac{MFR(R-PP1)}{MFR(R-PP2)} \geq 4.50 \qquad (Xb)$$

wherein
MFR (R-PP1) is the melt flow rate MFR$_2$ (230° C.) [g/10 min] of the first random propylene copolymer fraction (R-PP1),
MFR (R-PP2) is the melt flow rate MFR$_2$ (230° C.) [g/10 min] of the second random propylene copolymer fraction (R-PP2).

In one specific embodiment the random propylene copolymer (R-PP) comprises, preferably consists of, the first random propylene copolymer fraction (R-PP1) and the second random propylene copolymer fraction (R-PP2), wherein further the random propylene copolymer (R-PP) fulfills
(a) the inequation (XI), more preferably inequation (XIa), still more preferably inequation (XIb), $$\frac{Co(R-PP1)}{Co(R-PP)} \leq 0.65, \qquad (XI)$$

$$0.15 \leq \frac{Co(R-PP1)}{Co(R-PP)} \leq 0.60, \qquad (XIa)$$

$$0.20 \leq \frac{Co(R-PP1)}{Co(R-PP)} \leq 0.55 \qquad (XIb)$$

wherein
Co (R-PP1) is the comonomer content [wt.-%] of the first random propylene copolymer fraction (R-PP1),
Co (R-PP) is the comonomer content [wt.-%] of the random propylene copolymer (R-PP).
and/or
(b) the inequation (XII), more preferably inequation (XIIa), still more preferably inequation (XIIb), $$\frac{MFR(R-PP1)}{MFR(R-PP)} \geq 0.50 \qquad (XII)$$

$$10.0 \geq \frac{MFR(R-PP1)}{MFR(R-PP)} \geq 1.00 \qquad (XIIa)$$

$$8.0 \geq \frac{MFR(R-PP1)}{MFR(R-PP)} \geq 1.50 \qquad (XIIb)$$

wherein
MFR (R-PP1) is the melt flow rate MFR$_2$ (230° C.) [g/10 min] of the first random propylene copolymer fraction (R-PP1),
MFR (R-PP) is the melt flow rate MFR$_2$ (230° C.) [g/10 min] of the random propylene copolymer fraction (R-PP).

The values provided for the random propylene copolymer fraction (R-PP), the first random propylene copolymer fraction (R-PP1) and the second random propylene copolymer fraction (R-PP2) refer prior to vis-braking (steps (a) to (d)).

After the second reactor (R2) the matrix (M), i.e. the random propylene copolymer (R-PP), of the propylene copolymer (PC), e.g. of the heterophasic propylene copolymer (RA-HECO), is obtained. This matrix (M) is subsequently transferred into the third reactor (R3) in which the elastomeric propylene copolymer (E) is produced (step (e)) and thus the the propylene copolymer (PC), e.g. the heterophasic propylene copolymer (RAHECO), of the instant invention is obtained.

Concerning the individual properties of the elastomeric propylene copolymer (E) and the propylene copolymer, i.e. the heterophasic propylene copolymer (RAHECO), reference is made to the information provided above.

Preferably the weight ratio between the matrix (M), i.e. the random propylene copolymer (R-PP), after step (c) and the elastomeric propylene copolymer (E) produced in the step (e) is 60/40 to 90/10, more preferably 70/30 to 85/15.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), and the third reactor (R3) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like loop reactor (LR), whereas the second reactor (R2), and third reactor (R3) are gas phase reactors (GPR). Accordingly for the instant process at least three, preferably three polymerization reactors, namely a slurry reactor (SR), like loop reactor (LR), a first gas phase reactor (GPR-1), and a second gas phase reactor (GPR-2) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the propylene copolymer (PC), e.g. the heterophasic propylene copolymer (RAHECO), as defined above the conditions for the first reactor (R1), i.e. the slurry reactor (SR), like a loop reactor (LR), of step (a) may be as follows:

the temperature is within the range of 40° C. to 110° C., preferably between 60° C. and 100° C., like 68 to 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3), preferably in the second gas phase reactor (GPR-2), is similar to the second reactor (R2).

The residence time can vary in the three reactor zones.

In one embodiment of the process for producing the propylene copolymer (PC), e.g. the heterophasic propylene copolymer (RAHECO), the residence time the first reactor (R1), i.e. the slurry reactor (SR), like a loop reactor (LR), is in the range 0.2 to 4 hours, e.g. 0.3 to 1.5 hours and the residence time in the gas phase reactors will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the propylene copolymer (PC), e.g. of the heterophasic propylene copolymer (RAHECO), is obtained by a sequential polymerization process, as described above, in the presence of a catalyst system comprising a Ziegler-Natta catalyst and optionally an external donor, preferably a catalyst system comprising three components, namely as component (i) a Ziegler-Natta procatalyst, and optionally as component (ii) an organometallic cocatalyst and as component (iii) an external donor represented by formula (IIa) or (Iamb), preferably represented by formula (IIIa).

The process runs especially efficient by using a Ziegler-Natta catalyst system, preferably by using a Ziegler-Natta catalyst system as defined herein detail below, and a specific comonomer/propylene ratio in the second reactor (R2) and/or in the third (R3), respectively. Accordingly it is preferred that (a) the comonomer/propylene ratio [Co/C3], like the ethylene/propylene ratio [C2/C3], in the first reactor (R1), i.e. in step (a), is in the range of 1 to 15 mol/kmol, more preferably in the range of 2 to 8 mol/kmol, and/or (b) the comonomer/propylene ratio [Co/C3], like the ethylene/propylene ratio [C2/C3], in the second reactor (R2), i.e. in step (c), is in the range of 10 to 65 mol/kmol, more preferably in the range of 20 to 60 mol/kmol, and/or (c) the comonomer/propylene ratio [Co/C3], like the ethylene/propylene ratio [C2/C3], in the third reactor (R3), i.e. in step (e), is in the range of above 120 to 400 mol/kmol, more preferably in the range of 120 to 300 mol/kmol, even more preferably in the range of 120 to 200 mol/kmol, yet more preferably in the range of 130 to 180 mol/kmol.

In the following the used catalyst is defined in more detail.

Preferably component (i) is a Ziegler-Natta procatalyst which contains a trans-esterification product of a lower alcohol and a phthalic ester.

The procatalyst used according to the invention is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

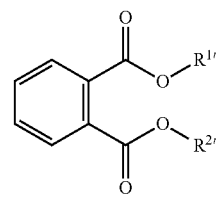

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$ The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl, and n is 1 to 6, is contacting with $TiCl_4$ to form a titanised carrier, followed by the steps of adding to said titanised carrier (i) a dialkylphthalate of formula (I) with $R^{1'}$ and $R^{2'}$ being independently at least a $C_5$-alkyl, like at least a $C_8$-alkyl, or preferably (ii) a dialkylphthalate of formula (I) with $R^{1'}$ and $R^{2'}$ being the same and being at least a $C_5$-alkyl, like at least a $C_8$-alkyl, or more preferably (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

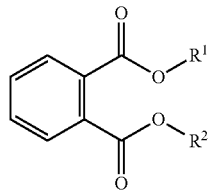

(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the propylene copolymer (PC), i.e. the heterophasic propylene copolymer (RAHECO), according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (Iamb). Formula (IIIa) is defined by $$Si(OCH_3)_2R_2^5 \qquad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \qquad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor of formula (IIIb) is diethylaminotriethoxysilane.

More preferably the external donor is selected from the group consisting of diethylaminotriethoxysilane [$Si(OCH_2CH_3)_3(N(CH_2CH_3)_2)$], dicyclopentyl dimethoxy silane [$Si(OCH_3)_2(cyclo-pentyl)_2$], diisopropyl dimethoxy silane [$Si(OCH_3)_2(CH(CH_3)_2)_2$] and mixtures thereof. Most preferably the external donor is dicyclopentyl dimethoxy silane [$Si(OCH_3)_2(cyclo-pentyl)_2$].

If desired the Ziegler-Natta procatalyst is modified by polymerizing a vinyl compound in the presence of the catalyst system, comprising the special Ziegler-Natta procatalyst (component (i)), the external donor (component (iii)) and optionally the cocatalyst (component (ii)), wherein the vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms. The so modified catalyst is used for the preparation of the propylene copolymer (PC), e.g. of the heterophasic propylene copolymer (RAHECO).

After step (f) the propylene copolymer (PC), e.g. the heterophasic propylene copolymer (RAHECO), can be optionally subjected a visbreaking step (step (g)) obtaining thereby a propylene copolymer (PC), i.e. a heterophasic propylene copolymer (RAHECO), with enhanced melt flow rate, i.e. with the melt flow rate as defined for the product as such. The vis-breaking may be carried out in any known manner, but typically the present invention envisages chemical vis-breaking using a peroxide vis-breaking agent. Typical vis-breaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert.butyl-peroxy) hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis(tert.butylperoxy-isopropyl)benzene (DIPP) (for instance sold under the tradenames Perkadox 14S and Lupperox DC). Suitable amounts of peroxide to be employed in accordance with the present invention are in principle known to the skilled person and can easily be calculated on the basis of the amount of the propylene copolymer (PC), e.g. of the heterophasic propylene copolymer (RAHECO), of step (f) to be subjected to vis-breaking, the $MFR_2$ (230° C.) value of the propylene copolymer (PC), e.g. of the heterophasic propylene copolymer (RAHECO), of step (g) to be subjected to vis-breaking and the desired target $MFR_2$ (230° C.) of the product to be obtained. Accordingly, typical amounts of peroxide visbreaking agent are from 0.001 to 0.10 wt.-%, more preferably from 0.002 to 0.05 wt.-%, based on the amount of polymer employed.

Typically, vis-breaking in accordance with the present invention is carried out in an extruder, so that under the suitable conditions, an increase of melt flow rate is obtained. During vis-breaking, higher molar mass chains of the starting product are broken statistically more frequently than lower molar mass molecules, resulting in an overall decrease of the average molecular weight and an increase in melt flow rate.

Due to the vis-breaking the melt flow rate, the polydispersity (Mw/Mn), and the intrinsic viscosity (IV), and the amount of xylene cold solubles (XCS) are affected. On the other hand the melting temperature, the total comonomer content and the comonomer content of the xylene cold soluble (XCS) fraction of the propylene copolymer (PC), e.g. of the heterophasic propylene copolymer (RAHECO), are not affected. Thus the non-visbroken propylene copolymer (after step (f)) and the visbroken propylene copolymer (after step (g)) have the same melting temperature, the same total comonomer content and the same comonomer content of the xylene cold soluble (XCS) fraction. Thus with regard to these embodiments reference is made to the information provided above.

The additives as stated above are added to the propylene copolymer (PC), i.e. to the heterophasic propylene copolymer (RAHECO) preferably by extruding. For mixing/extruding, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then further processed, e.g. by an extrusion blow molding process as described below.

Extrusion Blow Molded (EBM) Article

The present invention is especially directed to an extrusion blow molded article comprising the propylene copolymer (PC), e.g. the heterophasic propylene copolymer (RAHECO).

Extrusion blow molded articles differ essentially from injection blow molded articles and injection stretch blow molded articles. For instance extrusion blow molded article differ from injection blow molded articles and injection stretch blow molded articles in at least one of the properties selected from the group consisting of surface appearance, impact behavior, emissions, amount of volatiles and hexane extractables, to mention a few.

Accordingly the present invention is directed to an extrusion blow molded article comprising, preferably comprising at least 75 wt.-%, more preferably comprising at least 80 wt.-%, still more preferably comprising at least 90 wt.-%, yet more preferably comprising at least 95 wt.-%, still yet more preferably comprising at least 99 wt.-%, like consisting of, a propylene copolymer (PC), e.g. the heterophasic propylene copolymer (RAHECO).

Accordingly as the propylene copolymer (PC), e.g. the heterophasic propylene copolymer (RAHECO), is the main component in the extrusion blow molded article, the extrusion blow molded article has preferably the same properties as the propylene copolymer (PC) and the heterophasic propylene copolymer (RAHECO), respectively. Accordingly all properties mentioned for the propylene copolymer (PC), e.g. the heterophasic propylene copolymer (RAHECO), are equally applicable for the extrusion blow molded article. This applies in particular, but not only, for the melt flow rate $MFR_2$ (230° C.), the comonomer content (total, in XCS, in XCI), the intrinsic viscosity (in XCS, in XCI), the polydispersity (in XCS, in XCI), and the xylene cold soluble (XCS) content.

Preferably the extrusion blow molded articles are bottles or containers, preferably bottles for household or industrial chemicals, for cosmetics, for pharmaceutical packaging or for food and drinks. Even more preferred the bottles have a dimensions of up to 10 l, like 200 ml to 1 l, and/or a wall thickness of 0.1 to 1.0 mm, like 0.2 to 0.6 mm.

The preparation of extrusion blow molded articles is well known in the art and for instance described in "Propylene handbook", Nello Pasquinin (Ed.), $2^{nd}$ edition (2005), page 445, Hanser.

In extrusion blow molding (EBM), the polymer is melted and extruded into a hollow tube (a parison). This parison is then captured by closing it into a cooled forming mold. Compressed air is then blown into the parison, inflating it into the shape of the hollow bottle, container, or part. After the polymer has cooled sufficiently, the mold is opened and the part is ejected.

Use of the Propylene Copolymer (PC)/Use of the Heterophasic Propylene Copolymer (RAHECO)

The present invention is also directed to the use of the propylene copolymer (PC), e.g. the use of the heterophasic propylene copolymer (RAHECO), for the manufacture of an extrusion blow molded article. The present invention is in particular directed to the use of the propylene copolymer (PC), e.g. of the heterophasic propylene copolymer (RAHECO), as defined above to improve the optical properties of an extrusion blow molded article, like an extrusion blow molded bottle, comprising, preferably comprising at least 75 wt.-%, more preferably comprising at least 80 wt.-%, still more preferably comprising at least 90 wt.-%, yet more preferably comprising at least 95 wt.-%, still yet more preferably comprising at least 99 wt.-%, like consisting of, said propylene copolymer (PC), e.g. said heterophasic propylene copolymer (RAHECO).

The improvement is especially accomplished when the extrusion blow molded article, like the extrusion blow molded bottle, comprising, preferably comprising at least 70 wt.-%, more preferably comprising at least 80 wt.-%, still more preferably comprising at least 90 wt.-%, yet more preferably comprising at least 95 wt.-%, still yet more preferably comprising at least 99 wt.-%, like consisting of, said propylene copolymer (PC), e.g. said heterophasic propylene copolymer (RAHECO), has a bottle appearance factor (BAF) before sterilization of formula (I), more preferably (Ia), still more preferably (Ib), $$BAF = \frac{C \times G}{H} > 70 \quad (I)$$

$$BAF = \frac{C \times G}{H} > 110 \quad (Ia)$$

$$BAF = \frac{C \times G}{H} > 150 \quad (Ib)$$

wherein
H is the haze value
C is the clarity value,
G is the gloss value,
wherein further
the haze, the clarity and the gloss are determined according to ASTM D 1003-07 on a test specimen of 0.3×60×60 mm³ size cut from a bottle having a wall thickness of 0.3 mm made from the propylene copolymer (PC), e.g. from the heterophasic propylene copolymer (RAHECO).

Additionally or alternatively, the improvement is especially accomplished when the extrusion blow molded comprising the propylene copolymer (PC), e.g. the heterophasic propylene copolymer (RAHECO), in the amounts as indicated in the previous paragraph has a bottle appearance factor (BAF) after sterilization of formula (II), more preferably (IIa), still more preferably (IIb)

$$BAF = \frac{C \times G}{H} > 30 \quad (II)$$

$$BAF = \frac{C \times G}{H} > 40 \quad (IIa)$$

$$BAF = \frac{C \times G}{H} > 50 \quad (IIb)$$

wherein
H is the haze value
C is the clarity value,
G is the gloss value,
wherein further
the haze, the clarity and the gloss are determined according to ASTM D 1003-07 on a test specimen of 0.3×60×60 mm³ size cut from a sterilized bottle (as described in the example section) having a wall thickness of 0.3 mm made from the propylene copolymer (PC), e.g. from the heterophasic propylene copolymer (RAHECO).

Considering the provided information above, the following embodiments are especially preferred:

[1] Extrusion blow molded article comprising propylene copolymer, wherein the extrusion blow molded article and/or the propylene copolymer (PC) has/have (a) a melt flow rate MFR$_2$ (230° C.) measured according to ISO 1133 in the range of 2.0 to 6.0 g/10 min;
(b) a xylene cold soluble content (XCS) determined according ISO 16152 (25° C.) in the range of 20.0 to 40.0 wt.-%; and
(c) a comonomer content in the range of more than 4.5 to 12.0 wt.-%;
wherein further
(d) the comonomer content of xylene cold soluble (XCS) fraction of the extrusion blow molded article and/or the comonomer content of xylene cold soluble (XCS) fraction of the propylene copolymer (PC) is/are in the range of 12.0 to 28.0 wt.-%.

[2] Extrusion blow molded article according to paragraph [1], wherein the extrusion blow molded article comprises at least 90 wt.-% of the propylene copolymer (PC) based on the total amount of the extrusion blow molded article.

[3] Extrusion blow molded article according to paragraph [1] or [2], wherein the extrusion blow molded article and/or the propylene copolymer (PC)

(a) comprise(s) an α-nucleating agent; and/or
(b) has/have a hexane soluble content of below 10.0 wt.-%; and/or
(c) has/have a melting temperature Tm determined by differential scanning calorimetry (DSC) in the range of 145 to 160° C.

[4] Extrusion blow molded article according to any one of the preceding paragraphs [1] to [3], wherein the xylene cold insoluble (XCI) fraction of the extrusion blow molded article and/or the xylene cold insoluble (XCI) fraction or of the propylene copolymer (PC) has/have (a) a comonomer content in the range of 2.0 to 7.0; and/or
(b) a intrinsic viscosity (IV) determined according to DIN ISO 1628/1 (in decalin at 135° C.) in the range of 1.8 to below 3.0 dl/g; and/or
(c) a polydispersity (Mw/Mn) of more than 3.5 to 8.0.

[5] Extrusion blow molded article according to any one of the preceding paragraphs [1] to [4], wherein the xylene cold soluble (XCS) fraction of the extrusion blow molded article and/or the xylene cold soluble (XCS) fraction of the propylene copolymer (PC) has/have (a) a intrinsic viscosity (IV) determined according to DIN ISO 1628/1 (in decalin at 135° C.) in the range of more than 1.3 to 3.0 dl/g; and/or
(b) a polydispersity (Mw/Mn) of more than 3.5 to 8.0.

[6] Extrusion blow molded article to any one of the preceding paragraphs [1] to [5], wherein the extrusion blow molded article and/or of the propylene copolymer (PC) fulfill(s)

(a) inequation (I)

$$\frac{Co(\text{total})}{Co(XCS)} \leq 0.55 \quad (I)$$

wherein
Co (total) is the comonomer content [wt.-%] of the extrusion blow molded article and the comonomer content [wt.-%] of the propylene copolymer (PC), respectively;
Co (XCS) is the comonomer content [wt.-%] of the xylene cold soluble fraction (XCS) of the extrusion blow molded article and the comonomer content [wt.-%] of the xylene cold soluble fraction (XCS) of the propylene copolymer (PC), respectively; and/or
(b) inequation (II)

$$\frac{Co(\text{total})}{XCS} \leq 0.35 \quad (II)$$

wherein
Co (total) is the comonomer content [wt.-%] of the extrusion blow molded article and the comonomer content [wt.-%] of the propylene copolymer (PC), respectively,
XCS is the content of the xylene cold soluble fraction (XCS) [wt.-%] of the extrusion blow molded article and the content of the xylene cold soluble fraction (XCS) [wt.-%] of the propylene copolymer (PC), respectively; and/or (c) inequation (V)

$$2.8 \leq \frac{Co(XCS)}{Co(XCI)} \leq 6.0 \quad (V)$$

wherein
Co (XCS) is the comonomer content [wt.-%] of the xylene cold soluble fraction (XCS) of the extrusion blow molded article and the comonomer content [wt.-%] of the xylene cold soluble fraction (XCS) of the propylene copolymer (PC), respectively;
Co (XCI) is the comonomer content [wt.-%] of the xylene cold insoluble (XCI) of the extrusion blow molded article and the comonomer content [wt.-%] of the xylene cold insoluble (XCI) of the propylene copolymer (PC), respectively.

[7] Extrusion blow molded article according to any one of the preceding paragraphs [1] to [6], wherein wherein the extrusion blow molded article and/or of the propylene copolymer (PC) fulfill(s)
(a) inequation (III)

$$0.80 \leq \frac{IV(XCS)}{IV(XCI)} \leq 1.30 \quad (III)$$

wherein
IV (XCS) is the intrinsic viscosity (IV) [dl/g] of the xylene cold soluble (XCS) of the extrusion blow molded article and the intrinsic viscosity (IV) [dl/g] of the xylene cold soluble (XCS) of the propylene copolymer (PC), respectively;
IV (XCI) is the intrinsic viscosity (IV) [dl/g] of the xylene cold insoluble (XCI) of the extrusion blow molded article and the intrinsic viscosity (IV) [dl/g] of the xylene cold insoluble (XCI) of the propylene copolymer (PC), respectively.
(b) inequation (IV)

$$0.70 \leq \frac{P(XCS)}{P(XCI)} \leq 1.35 \quad (IV)$$

wherein
P (XCS) is the polydispersity (Mw/Mn) of the xylene cold soluble (XCS) of the extrusion blow molded article and the polydispersity (Mw/Mn) of the xylene cold soluble (XCS) of the propylene copolymer (PC), respectively;
P (XCI) is the polydispersity (Mw/Mn) of the xylene cold soluble (XCS) of the extrusion blow molded article and the polydispersity (Mw/Mn) of the xylene cold soluble (XCS) of the propylene copolymer (PC), respectively.

[8] Extrusion blow molded article according to any one of the preceding paragraphs [1] to [7], wherein the propylene copolymer (PC) is a heterophasic propylene copolymer (RAHECO) comprising a matrix (M) being a random propylene copolymer (R-PP) and an elastomeric propylene copolymer (E) dispersed in said matrix (M), wherein preferably the weight ratio between the matrix (M) and the elastomeric propylene copolymer (E) is 60/40 to 90/10.

[9] Extrusion blow molded article according to paragraph [8], wherein the random propylene copolymer (R-PP)
(a) has a comonomer content in the range of 1.0 to 7.0 wt.-%, and/or (b) fulfills inequation (VI)

$$\frac{Co(\text{total})}{Co(RPP)} \geq 1.3 \quad (VI)$$

wherein
Co (total) is the comonomer content [wt.-%] of the propylene copolymer (PC), e.g. of the heterophasic propylene copolymer (RAHECO),
Co (RPP) is the comonomer content [wt.-%] of the random propylene copolymer (R-PP), and/or
(c) has a xylene cold soluble (XCS) fraction in the range of 5.0 to below 20.0 wt.-%.

[10] Extrusion blow molded article according to paragraph [8] or [9], wherein the random propylene copolymer (R-PP) comprises at least two random propylene copolymer fractions, said two random propylene copolymer fractions differ in the comonomer content, i.e. one fraction of the two random polymer copolymer fractions is the commoner lean fraction and the other fraction is the comonomer rich fraction, wherein further
(a) the weight ratio between the commoner lean fraction and the comonomer rich fraction 20/80 to 80/20; and/or
(b) said lean fraction and said rich fraction fulfils inequation (VII)

$$\frac{Co(\text{lean})}{Co(\text{rich})} \leq 0.60 \quad (VII)$$

wherein
Co (lean) is the comonomer content [wt.-%] of the commoner lean fraction;
Co (rich) is the comonomer content [wt.-%] of the comonomer rich fraction; and/or
(c) the commoner lean fraction has a comonomer content in the range 0.2 to 4.0 wt.-%; and/or
(d) the comonomer rich fraction has a comomer content in the range 1.0 to 12.0 wt.-%.

[11] Extrusion blow molded article according to any one of the preceding paragraphs [8] to [10], wherein the elastomeric propylene copolymer (E) has a comonomer content in the range of 12.0 to 38.0 wt.-%.

[12] Extrusion blow molded article according to any one of the preceding paragraphs [1] to [11], wherein the propylene copolymer (PC), e.g. the heterophasic propylene copolymer (RAHECO), has been vis-broken.

[13] Extrusion blow molded article according to paragraph [12], wherein the heterophasic propylene copolymer (RAHECO) comprises the random propylene copolymer (R-PP), wherein further said random propylene copolymer (R-PP) prior to vis-breaking comprises at least two different random propylene copolymer fractions, wherein further the two random propylene copolymer fractions differ in the comonomer content and/or in the melt flow rate MFR$_2$ (230° C.), preferably differ in the comonomer content and in the melt flow rate MFR$_2$ (230° C.).

[14] Extrusion blow molded article according to paragraph [13], wherein
(a) one fraction of the two random polymer copolymer fractions is the commoner lean fraction and the other fraction is the comonomer rich fraction, wherein further the comonomer lean fraction and the comonomer rich fraction fulfils inequation (VII)

$$\frac{Co(\text{lean})}{Co(\text{rich})} \leq 0.60 \quad (\text{VII})$$

wherein

Co (lean) is the comonomer content [wt.-%] of the random propylene copolymer fraction with the lower comonomer content, Co (rich) is the comonomer content [wt.-%] of the random propylene copolymer fraction with the higher comonomer content; and/or, preferably and, (b) one fraction of the two random propylene copolymer fractions is the low melt flow rate $MFR_2$ (230° C.) fraction and the other fraction is the high melt flow rate $MFR_2$ (230° C.) fraction, wherein further the low flow fraction and the high flow fraction fulfils inequation (IX)

$$\frac{MFR(\text{high})}{MFR(\text{low})} \geq 1.80 \quad (\text{IX})$$

wherein

MFR (high) is the melt flow rate $MFR_2$ (230° C.) [g/10 min] of the random propylene copolymer fraction with the higher melt flow rate $MFR_2$ (230° C.), MFR (low) is the melt flow rate $MFR_2$ (230° C.) [g/10 min] of the random propylene copolymer fraction with the lower melt flow rate $MFR_2$ (230° C.).

[15] Extrusion blow molded article according to paragraph [13] or [14], wherein the two random polymer copolymer fractions are a first random propylene copolymer fraction (R-PP1) and a second random propylene copolymer fraction (R-PP2), wherein further (a) the first random propylene copolymer fraction (R-PP1) has a higher comonomer content and melt flow rate $MFR_2$ (230° C.) than the second random propylene copolymer fraction (R-PP2); or (b) the second random propylene copolymer fraction (R-PP2) has a higher comonomer content and melt flow rate $MFR_2$ (230° C.) than the first random propylene copolymer fraction (R-PP1); or (c) the first random propylene copolymer fraction (R-PP1) has a higher comonomer content but a lower melt flow rate $MFR_2$ (230° C.) than the second random propylene copolymer fraction (R-PP2); or (d) the second random propylene copolymer fraction (R-PP2) has a higher comonomer content but a lower melt flow rate $MFR_2$ (230° C.) than the first random propylene copolymer fraction (R-PP1).

[16] Extrusion blow molded article according to any one of the preceding paragraphs [1] to [15], wherein the extrusion blow molded article is a bottle.

[17] Use of a propylene copolymer (PC) according to any one of the preceding paragraphs [1], and, [3] to [15] to improve the optical properties of an extrusion blow molded article, like an extrusion blow molded bottle, comprising at least 90 wt.-% of said propylene copolymer (PC).

[18] Use according to paragraph [17], wherein the improvement is accomplished when the extrusion blow molded article, like the extrusion blow molded bottle, has a bottle appearance factor (BAF) before sterilization of at least 70, preferably of at least 110.

In the following the present invention is further illustrated by means of examples.

EXAMPLES

1. Measuring Methods

The following definitions of terms and determination methods apply for the above general description of the invention as well as to the below examples unless otherwise defined. Calculation of comonomer content of the second propylene copolymer fraction (R-PP2):

$$\frac{C(PP) - w(PP1) \times C(PP1)}{w(PP2)} = C(PP2) \quad (\text{I})$$

wherein w(PP1) is the weight fraction [in wt.-%] of the first random propylene copolymer fraction (R-PP1), w(PP2) is the weight fraction [in wt.-%] of second propylene copolymer fraction (R-PP2), C(PP1) is the comonomer content [in wt.-%] of the first random propylene copolymer fraction (R-PP1), C(PP) is the comonomer content [in wt.-%] of the random propylene copolymer (R-PP), C(PP2) is the calculated comonomer content [in wt.-%] of the second random propylene copolymer fraction (R-PP2).

Calculation of the xylene cold soluble (XCS) content of the second propylene copolymer fraction (R-PP2):

$$\frac{XS(PP) - w(PP1) \times XS(PP1)}{w(PP2)} = XS(PP2) \quad (\text{II})$$

wherein w(PP1) is the weight fraction [in wt.-%] of the first random propylene copolymer fraction (R-PP1), w(PP2) is the weight fraction [in wt.-%] of second random propylene copolymer fraction (R-PP2), XS(PP1) is the xylene cold soluble (XCS) content [in wt.-%] of the first random propylene copolymer fraction (R-PP1), XS(PP) is the xylene cold soluble (XCS) content [in wt.-%] of the random propylene copolymer (R-PP), XS(PP2) is the calculated xylene cold soluble (XCS) content [in wt.-%] of the second random propylene copolymer fraction (R-PP2).

Calculation of melt flow rate $MFR_2$ (230° C.) of the second propylene copolymer fraction (R-PP2):

$$MFR(PP2) = 10^{\left[\frac{\log(MFR(PP)) - w(PP1) \times \log(MFR(PP1))}{w(PP2)}\right]} \quad (\text{III})$$

wherein w(PP1) is the weight fraction [in wt.-%] of the first random propylene copolymer fraction (R-PP1), w(PP2) is the weight fraction [in wt.-%] of second random propylene copolymer fraction (R-PP2), MFR(PP1) is the melt flow rate $MFR_2$ (230° C.) [in g/10 min] of the first random propylene copolymer fraction (R-PP1), MFR(PP) is the melt flow rate $MFR_2$ (230° C.) [in g/10 min] of the random propylene copolymer (R-PP), MFR(PP2) is the calculated melt flow rate $MFR_2$ (230° C.) [in g/10 min] of the second random propylene copolymer fraction (R-PP2).

Calculation of comonomer content of the elastomeric propylene copolymer (E), respectively:

$$\frac{C(RAHECO) - w(PP) \times C(PP)}{w(E)} = C(E) \quad \text{(IV)}$$

wherein w(PP) is the weight fraction [in wt.-%] of the random propylene copolymer (R-PP), i.e. polymer produced in the first and second reactor (R1+R2), w(E) is the weight fraction [in wt.-%] of the elastomeric propylene copolymer (E), i.e. polymer produced in the third reactor (R3)

C(PP) is the comonomer content [in wt.-%] of the random propylene copolymer (R-PP), i.e. comonomer content [in wt.-%] of the polymer produced in the first and second reactor (R1+R2), C(RAHECO) is the comonomer content [in wt.-%] of the propylene copolymer, i.e. is the comonomer content [in wt.-%] of the polymer obtained after polymerization in the third reactor (R4), C(E) is the calculated comonomer content [in wt.-%] of elastomeric propylene copolymer (E), i.e. of the polymer produced in the third reactor (R3).

$MFR_2$ (230° C.) is measured according to ISO 1133 (230° C., 2.16 kg load).

Comonomer content, especially ethylene content is measured with Fourier transform infrared spectroscopy (FTIR) calibrated with $^{13}$C-NMR. When measuring the ethylene content in polypropylene, a thin film of the sample (thickness about 250 μm) was prepared by hot-pressing. The area of absorption peaks 720 and 733 $cm^{-1}$ for propylene-ethylene-copolymers was measured with Perkin Elmer FTIR 1600 spectrometer. Propylene-1-butene-copolymers were evaluated at 767 $cm^{-1}$. The method was calibrated by ethylene content data measured by $^{13}$C-NMR.

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005 Jul. 1. The part which remains insoluble is the xylene cold insoluble (XCI) fraction.

Hexane soluble (C6-solubles, wt.-%): Content of hexane soluble is measured according to European Pharmacopoeia 6.0, EP316

10 g of a sample taken from 0.3 mm thick bottles was put into a 300 ml Erlenmeyer flask and 100 ml of n-hexane was added. The mixture was boiled under stirring in a reflux condenser for 4 h. The hot solution was cooled down under stirring for 45 min and filtered under vacuum (G4 glasfilter) and the filtrate is put into a round shenk (dried in a vacuum oven at 90° C. and weighted with 0.0001 g exactly). Then the hexane was evaporated under a nitrogen stream on a rotary evaporator. The round shenk was dried in a vacuum oven at 90° C. over night and was put into a desiccator for at least 2 hours to cool down. The shenk was weighted again and the hexane soluble was calculated therefrom.

Number Average Molecular Weight ($M_n$), Weight Average Molecular Weight ($M_w$) and Polydispersity (Mw/Mn) are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GM-HXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Melting temperature ($T_m$) and heat of fusion ($H_f$), crystallization temperature ($T_c$) and heat of crystallization ($H_e$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_e$) are determined from the cooling step, while melting temperature and heat of fusion ($H_f$) are determined from the second heating step Flexural Modulus: The flexural modulus was determined in 3-point-bending at 23° C. according to ISO 178 on 80×10×4 $mm^3$ test bars injection moulded in line with EN ISO 1873-2

Description/Dimension of the Bottles 1 l bottles, having an outer diameter of 90 mm, wall thickness: 0.3 mm; overall-height of 204 mm, height of the cylindrical mantle of 185 mm Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

Transparency, Clarity, and Haze Measurement on Bottles

Instrument: Haze-gard plus from BYK-Gardner

Testing: according to ASTM D1003 (as for injection molded plates)

Method: The measurement is done on the outer wall of the bottles. The top and bottom of the bottles are cut off. The resulting round wall is then split in two, horizontally. Then from this wall six equal samples of app. 60×60 mm are cut from close to the middle. The specimens are placed into the instrument with their convex side facing the haze port. Then the transparency, haze and clarity are measured for each of the six samples and the haze value is reported as the average of these six parallels.

Gloss Measurement on Bottles

Instrument: Sceen TRI-MICROGLOSS 20-60-80 from BYK-Gardner 20

Testing: ASTM D 2457 (as for injection molded plates)

The bottles: It is measured on the wall of the bottles. The top and bottom of the bottles is cut off. This round wall is then split in two, horizontally. Then this wall is cut into six equal 25 samples of app. 90×90 mm, just to fit into a special light trap made for testing on injection molded parts. Then the gloss at 20° is measured on these six samples, and the average value is reported as gloss at 20°.

2. Examples

The catalyst used in the polymerization process for examples CE1, CE2 and CE3 has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) was used The aluminium to donor ratio is indicated in table 1. Before the polymerization, the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307.

The resulting polymers CE1, CE2 and CE3 were vis-broken to the inventive examples IE1, IE2 and IE3 in a co-rotating twin-screw extruder (type: Coperion ZSK 57) with suitable amounts of 2,5-dimethyl-2,5-di-(tert.butylperoxy) hexane (Trigonox® 101 supplied by AKZO Nobel, Netherlands) added to the extruder as concentrate of 1 wt.-% on polypropylene powder. As additives 0.04 wt. % synthetic hydrotalcite (DHT-4A supplied by Kisuma Chemicals, Netherlands) and 0.15 wt % Irganox B 215 (1:2-blend of Irganox 1010 (Pentaerythrityl-tetrakis(3-(3',5'-di-tert.butyl-4-hydroxytoluyl)-propionate and tris(2,4-di-t-butylphenyl)phosphate)phosphite) of BASF AG, Germany were added to the polymers in the same step.

For the production of 1 liter round bottles like used for testing in the inventive work a "Fischer Müller" Blow Molding Machine was used. The main processing parameters for the production are as follows:

Temperature profile: 180 to 200° C. applied in extruder, adapter and head
Melt temperature measured: 190 to 200° C.
Speed of extruder (revolution per minute; rpm): 13 to 16 rpm
Die gap: the die gap was adjusted to get a bottle with a weight of 40 g with Borealis grade RB307MO (random propylene copolymer with a density of 902 kg/m$^3$ and a MFR$_2$ of 1.5 g/10 min)
Cycle time: 12 to 16 seconds

TABLE 1

Polymerization conditions

| | | CE1 | CE2 | CE3 |
|---|---|---|---|---|
| TEAL/D | [mol/mol] | 15 | 15 | 15 |
| Loop | | | | |
| MFR$_2$ | [g/10 min] | 6.7 | 3.4 | 3.2 |
| C2 content | [wt.-%] | 2.4 | 2.0 | 2.2 |
| XCS | [wt.-%] | 3.7 | 3.8 | 3.9 |
| H$_2$/C3 ratio | [mol/kmol] | 5.03 | 2.99 | 3.00 |
| C2/C3 ratio | [mol/kmol] | 4.02 | 3.96 | 3.96 |
| 1 GPR | | | | |
| MFR$_2$ | [g/10 min] | 1.2 | 1.1 | 1.1 |
| C2 content | [wt.-%] | 5.1 | 5.1 | 4.9 |
| XCS | [wt.-%] | 18.1 | 15.8 | 16.2 |
| H$_2$/C3 ratio | [mol/kmol] | 5.7 | 5.2 | 5.4 |
| C2/C3 ratio | [mol/kmol] | 52.2 | 51.8 | 53.1 |

TABLE 1-continued

Polymerization conditions

| | | CE1 | CE2 | CE3 |
|---|---|---|---|---|
| 2 GPR | | | | |
| MFR$_2$ | [g/10 min] | 1.9 | 1.4 | 1.7 |
| C2 content | [wt.-%] | 8.6 | 7.5 | 7.3 |
| XCS | [wt.-%] | 33.3 | 32.8 | 32.8 |
| Tm | [° C.] | 150 | 150 | 150 |
| H$_2$/C3 ratio | [mol/kmol] | 982 | 369 | 1011 |
| C2/C3 ratio | [mol/kmol] | 307 | 152 | 151 |
| Split | | | | |
| Loop | [wt.-%] | 35.9 | 34.3 | 34.5 |
| 1GPR | [wt.-%] | 43.9 | 45.5 | 45.7 |
| 2GPR | [wt.-%] | 20.2 | 20.2 | 19.8 |

TABLE 2

Vis-breaking step

| | | IE1 | IE2 | IE3 |
|---|---|---|---|---|
| Polymer used | [—] | CE1 | CE2 | CE3 |
| POX* | [wt.-%] | 0.18 | 0.70 | 0.35 |

*POX is a polymer containing 1 wt.-% of 2,5-dimethyl-2,5-di-(tert. butylperoxy)hexane (Trigonox ® 101 supplied by AKZO Nobel, Netherlands)

TABLE 3

Properties

| | | CE1 | CE2 | CE3 | IE1 | 1E2 | 1E3 |
|---|---|---|---|---|---|---|---|
| MFR$_2$ | [g/10 min] | 1.9 | 1.4 | 1.7 | 2.8 | 2.9 | 3.1 |
| C2 | [wt.-%] | 8.6 | 7.5 | 7.3 | 8.6 | 7.5 | 7.3 |
| XCS | [wt.-%] | 33.3 | 32.8 | 32.8 | 32.1 | 31.6 | 31.5 |
| Tm | [° C.] | 150 | 150 | 150 | 150 | 150 | 151 |
| C2 of XCS | [wt.-%] | 20.5 | 18.4 | 17.5 | 20.2 | 18.2 | 17.3 |
| IV of XCS | [dl/g] | 2.1 | 2.5 | 2.0 | 2.1 | 2.2 | 2.0 |
| Mw/Mn of XCS | [-] | 6.1 | 6.4 | 5.5 | 6.2 | 6.4 | 5.6 |
| MFR$_2$ of XCI | [g/10 min] | 1.7 | 1.4 | 1.3 | 3.0 | 3.0 | 3.1 |
| Mw/Mn of XCI | [-] | 5.3 | 5.2 | 5.3 | 5.1 | 5.2 | 5.2 |
| IV of XCI | [dl/g] | 2.4 | 2.5 | 2.6 | 2.1 | 2.1 | 2.1 |
| Flex Modulus | [MPa] | 468 | 516 | 522 | 444 | 488 | 492 |
| C6-Solubles | [wt.-%] | 6.8 | 4.2 | 5.0 | 7.0 | 4.8 | 4.8 |

TABLE 4

Properties on bottles (0.3 mm thickness and 1 l volume)

| | | CE1 | CE2 | CE3 | IE1 | IE2 | IE3 |
|---|---|---|---|---|---|---|---|
| Transparency b.s. | [%] | 89 | 91 | 92 | 89 | 91 | 92 |
| Haze b.s. | [%] | 26 | 25 | 22 | 22 | 18 | 17 |
| Clarity b.s. | [%] | 72 | 67 | 71 | 82 | 89 | 89 |
| Gloss 20° b.s. | [%] | 13 | 7 | 10 | 19 | 26 | 32 |
| BAF b.s. | [-] | 35 | 19 | 34 | 70 | 125 | 171 |
| Transparency a.s. | [%] | 86 | 90 | 91 | 90 | 92 | 92 |
| Haze a.s. | [%] | 30 | 26 | 30 | 29 | 25 | 31 |
| Clarity a.s | [%] | 75 | 66 | 63 | 80 | 86 | 75 |
| Gloss 20° a.s. | [%] | 10 | 8 | 8 | 18 | 18 | 13 |
| BAF a.s | [-] | 25 | 20 | 16 | 50 | 62 | 31 |

The invention claimed is:

1. Extrusion blow molded article comprising at least 90 wt. % of a propylene copolymer based on the total amount of the extrusion blow molded article, wherein the propylene copolymer (PC) has:

(a) a melt flow rate MFR$_2$ (230° C.) measured according to ISO 1133 in the range of 2.0 to 6.0 g/10min;

(b) a xylene cold soluble content (XCS) determined according ISO 16152 (25° C.) in the range of 20.0 to 40.0 wt. %;
(c) a comonomer content in the range of more than 4.5 to 12.0 wt. %; and
(d) fulfills inequation (II):

$$\frac{Co(\text{total})}{XCS} \le 0.35 \qquad (II)$$

wherein, Co (total) is the comonomer content [wt. %] of the propylene copolymer (PC),
XCS is the content of the xylene cold soluble fraction (XCS) [wt. %] of the propylene copolymer (PC);
wherein further;
(e) the comonomer content of xylene cold soluble (XCS) fraction of the propylene copolymer (PC) is in the range of 12.0 to 28.0 wt. %.

2. Extrusion blow molded article according to claim 1, wherein the comonomer content of xylene cold soluble (XCS) fraction of the extrusion blow molded article is in the range of 12.0 to 28.0 wt. %.

3. Extrusion blow molded article according to claim 1, wherein the extrusion blow molded article and/or the propylene copolymer (PC):
(a) comprise(s) an a-nucleating agent; and/or
(b) has/have a hexane soluble content of below 10.0 wt. %; and/or
(c) has/have a melting temperature Tm determined by differential scanning calorimetry (DSC) in the range of 145° C. to 160° C.

4. Extrusion blow molded article according to claim 1, wherein the xylene cold insoluble (XCI) fraction of the extrusion blow molded article and/or the xylene cold insoluble (XCI) fraction of the propylene copolymer (PC) has/have:
(a) a comonomer content in the range of 2.0 to 7.0 wt. %; and/or
(b) an intrinsic viscosity (IV) determined according to DIN ISO 1628/1 (in decalin at 135° C.) in the range of 1.8 to below 3.0 dl/g; and/or
(c) a polydispersity (Mw/Mn) of more than 3.5 to 8.0.

5. Extrusion blow molded article according to claim 1, wherein the xylene cold soluble (XCS) fraction of the extrusion blow molded article and/or the xylene cold soluble (XCS) fraction of the propylene copolymer (PC) has/have:
(a) an intrinsic viscosity (IV) determined according to DIN ISO 1628/1 (in decalin at 135° C.) in the range of more than 1.3 to 3.0 dl/g; and/or
(b) a polydispersity (Mw/Mn) of more than 3.5 to 8.0.

6. Extrusion blow molded article according to claim 1, wherein the extrusion blow molded article and/or of the propylene copolymer (PC) fulfill(s):
(a) inequation (I):

$$\frac{Co(\text{total})}{Co(XCS)} \le 0.55 \qquad (I)$$

wherein, Co (total) is the comonomer content [wt. %] of the extrusion blow molded article and the comonomer content [wt. %] of the propylene copolymer (PC), respectively;
Co (XCS) is the comonomer content [wt. %] of the xylene cold soluble fraction (XCS) of the extrusion blow molded article and the comonomer content [wt. %] of the xylene cold soluble fraction (XCS) of the propylene copolymer (PC), respectively; and/or
(b) inequation (II), $$\frac{Co(\text{total})}{XCS} \le 0.35 \qquad (II)$$

wherein, Co (total) is the comonomer content [wt. %] of the extrusion blow molded article and the comonomer content [wt. %] of the propylene copolymer (PC), respectively,
XCS is the content of the xylene cold soluble fraction (XCS) [wt.-%] of the extrusion blow molded article and the content of the xylene cold soluble fraction (XCS) [wt.-%] of the propylene copolymer (PC), respectively; and/or
(c) inequation (V):

$$2.8 \le \frac{Co(XCS)}{Co(XCI)} \le 6.0 \qquad (V)$$

wherein, Co (XCS) is the comonomer content [wt. %] of the xylene cold soluble fraction (XCS) of the extrusion blow molded article and the comonomer content [wt. %] of the xylene cold soluble fraction (XCS) of the propylene copolymer (PC), respectively;
Co (XCI) is the comonomer content [wt.-%] of the xylene cold insoluble (XCI) of the extrusion blow molded article and the comonomer content [wt.-%] of the xylene cold insoluble (XCI) of the propylene copolymer (PC), respectively.

7. Extrusion blow molded article according to claim 1, wherein the extrusion blow molded article and/or of the propylene copolymer (PC) fulfill(s):
(a) inequation (III):

$$0.80 \le \frac{IV(XCS)}{IV(XCI)} \le 1.30 \qquad (III)$$

wherein, IV (XCS) is the intrinsic viscosity (IV) [dl/g] of the xylene cold soluble (XCS) of the extrusion blow molded article and the intrinsic viscosity (IV) [dl/g] of the xylene cold soluble (XCS) of the propylene copolymer (PC), respectively;
IV (XCI) is the intrinsic viscosity (IV) [dl/g] of the xylene cold insoluble (XCI) of the extrusion blow molded article and the intrinsic viscosity (IV) [dl/g] of the xylene cold insoluble (XCI) of the propylene copolymer (PC), respectively.
(b) inequation (IV):

$$0.70 \le \frac{P(XCS)}{P(XCI)} \le 1.35 \qquad (IV)$$

wherein, P (XCS) is the polydispersity (Mw/Mn) of the xylene cold soluble (XCS) of the extrusion blow molded article and the polydispersity (Mw/Mn) of the xylene cold soluble (XCS) of the propylene copolymer (PC), respectively;
P (XCI) is the polydispersity (Mw/Mn) of the xylene cold soluble (XCS) of the extrusion blow molded article and the polydispersity (Mw/Mn) of the xylene cold soluble (XCS) of the propylene copolymer (PC), respectively.

8. Extrusion blow molded article according to claim 1, wherein the propylene copolymer (PC) is a heterophasic propylene copolymer (RAHECO) comprising a matrix (M) being a random propylene copolymer (R-PP) and an elastomeric propylene copolymer (E) dispersed in said matrix (M), wherein the weight ratio between the matrix (M) and the elastomeric propylene copolymer (E) is 60/40 to 90/10.

9. Extrusion blow molded article according to claim 8, wherein the random propylene copolymer (R-PP):
    (a) has a comonomer content in the range of 1.0 to 7.0 wt. %, and/or
    (b) fulfills inequation (VI):

$$\frac{Co(\text{total})}{Co(RPP)} \geq 1.3 \quad (VI)$$

wherein, Co (total) is the comonomer content [wt. %] of the propylene copolymer (PC),
Co (RPP) is the comonomer content [wt. %] of the random propylene copolymer (R-PP), and/or
    (c) has a xylene cold soluble (XCS) fraction in the range of 5.0 to below 20.0 wt. %.

10. Extrusion blow molded article according to claim 8, wherein the random propylene copolymer (R-PP) comprises at least two random propylene copolymer fractions, said two random propylene copolymer fractions differ in the comonomer content, wherein further:
    (a) the weight ratio between the commoner lean fraction and the comonomer rich fraction is 20/80 to 80/20; and/or
    (b) said lean fraction and said rich fraction fulfills inequation (VII):

$$\frac{Co(\text{lean})}{Co(\text{rich})} \leq 0.60 \quad (VII)$$

wherein Co (lean) is the comonomer content [wt. %] of the commoner lean fraction;
Co (rich) is the commoner content [wt. %] of the comonomer rich fraction; and/or
    (c) the commoner lean fraction has a comonomer content in the range 0.2 to 4.0 wt. %; and/or
    (d) the comonomer rich fraction has a comomer content in the range 1.0 to 12.0 wt. %.

11. Extrusion blow molded article according to claim 8, wherein the elastomeric propylene copolymer (E) has a comonomer content in the range of 12.0 to 38.0 wt. %.

12. Extrusion blow molded article according to claim 1, wherein the propylene copolymer (PC) has been vis-broken.

13. Extrusion blow molded article according to claim 12, wherein the heterophasic propylene copolymer (RAHECO) comprises the random propylene copolymer (R-PP), wherein further said random propylene copolymer (R-PP) prior to vis-breaking comprises at least two different random propylene copolymer fractions, wherein further the two random propylene copolymer fractions differ in the comonomer content and/or in the melt flow rate MFR$_2$ (230° C).

14. Extrusion blow molded article according to claim 13, wherein:
    (a) one fraction of the two random polymer copolymer fractions is the commoner lean fraction and the other fraction is the comonomer rich fraction, wherein further the comonomer lean fraction and the comonomer rich fraction fulfills inequation (VII):

$$\frac{Co(\text{lean})}{Co(\text{rich})} \leq 0.60 \quad (VII)$$

wherein, Co (lean) is the comonomer content [wt. %] of the random propylene copolymer fraction with the lower comonomer content,
Co (rich) is the comonomer content [wt. %] of the random propylene copolymer fraction with the higher comonomer content; and/or,
    (b) one fraction of the two random propylene copolymer fractions is the low melt flow rate MFR$_2$ (230° C.) fraction and the other fraction is the high melt flow rate MFR$_2$ (230° C.) fraction, wherein further the low flow fraction and the high flow fraction fulfills inequation (IX):

$$\frac{MFR(\text{high})}{MFR(\text{low})} \geq 1.80 \quad (IX)$$

wherein, MFR (high) is the melt flow rate MFR$_2$ (230° C.) [g/10min] of the random propylene copolymer fraction with the higher melt flow rate MFR$_2$ (230° C.),
MFR (low) is the melt flow rate MFR$_2$ (230° C.) [g/10min] of the random propylene copolymer fraction with the lower melt flow rate MFR$_2$ (230° C.).

15. Extrusion blow molded article according to claim 13, wherein the two random polymer copolymer fractions are a first random propylene copolymer fraction (R-PP1) and a second random propylene copolymer fraction (R-PP2), wherein further:
    (a) the first random propylene copolymer fraction (R-PP1) has a higher comonomer content and melt flow rate MFR$_2$ (230° C.) than the second random propylene copolymer fraction (R-PP2); or
    (b) the second random propylene copolymer fraction (R-PP2) has a higher comonomer content and melt flow rate MFR$_2$ (230° C.) than the first random propylene copolymer fraction (R-PP1); or
    (c) the first random propylene copolymer fraction (R-PP1) has a higher comonomer content but a lower melt flow rate MFR$_2$ (230° C.) than the second random propylene copolymer fraction (R-PP2); or
    (d) the second random propylene copolymer fraction (R-PP2) has a higher comonomer content but a lower melt flow rate MFR$_2$ (230° C.) than the first random propylene copolymer fraction (R-PP1).

16. Extrusion blow molded article according to claim 1, wherein the extrusion blow molded article is a bottle.

17. An extrusion blow molded bottle comprising at least 90 wt. % of a propylene copolymer based on the total amount of the extrusion blow molded bottle, wherein the propylene copolymer (PC) has:
    (a) a melt flow rate MFR2 (230° C.) measured according to ISO 1133 in the range of 2.0 to 6.0 g/10min;
    (b) a xylene cold soluble content (XCS) determined according to ISO 16152 (25° C.) in the range of 20.0 to 40.0 wt. %;
    (c) a comonomer content in the range of more than 4.5 to 12.0 wt. %; and (d) fulfills inequation (II):

$$\frac{co(\text{total})}{XCS} \leq 0.35 \qquad (II)$$

wherein, Co (total) is the comonomer content [wt.%] of the propylene copolymer (PC), XCS is the content of the xylene cold soluble fraction (XCS) [wt.%] of the propylene copolymer (PC);

wherein further;

(e) the comonomer content of xylene cold soluble (XCS) fraction of the propylene copolymer (PC) is in the range of 12.0 to 28.0 wt. %.

18. The extrusion blow molded bottle of claim 17, having a bottle appearance factor (BAF, BAF=(clarity * gloss) / haze; clarity and haze measured according to ASTM D1003, gloss measured according to ASTM D 2457) before sterilization of at least 70.

\* \* \* \* \*